US012773661B2

(12) United States Patent
Spiteri et al.

(10) Patent No.: US 12,773,661 B2
(45) Date of Patent: Oct. 27, 2026

(54) METHODS AND DEVICES FOR STEAM DRIVEN CARBON DIOXIDE CAPTURE

(71) Applicant: CLIMEWORKS AG, Zurich (CH)

(72) Inventors: Alexander Spiteri, Zürich (CH); Stefan Schenk, Zürich (CH); Anca Elena Timofte, Zürich (CH); Benjamin Megerle, Zürich (CH); Christoph Gebald, Zürich (CH); Jan André Wurzbacher, Zürich (CH); Adelaide Calbry-Muzyka, Zürich (CH)

(73) Assignee: CLIMEWORKS AG, Glattpark (CH)

( * ) Notice: Subject to any disclaimer, the term of this patent is extended or adjusted under 35 U.S.C. 154(b) by 972 days.

(21) Appl. No.: 17/927,532

(22) PCT Filed: May 25, 2021

(86) PCT No.: PCT/EP2021/063941
§ 371 (c)(1),
(2) Date: Nov. 23, 2022

(87) PCT Pub. No.: WO2021/239749
PCT Pub. Date: Dec. 2, 2021

(65) Prior Publication Data

US 2023/0201759 A1 Jun. 29, 2023

(30) Foreign Application Priority Data

May 27, 2020 (EP) .................................... 20176843
May 27, 2020 (EP) .................................... 20176846

(51) Int. Cl.
*B01D 53/047* (2006.01)
*B01D 53/04* (2006.01)
(Continued)

(52) U.S. Cl.
CPC .......... *B01D 53/0476* (2013.01); *B01D 53/02* (2013.01); *B01D 53/04* (2013.01);
(Continued)

(58) Field of Classification Search
None
See application file for complete search history.

(56) References Cited

U.S. PATENT DOCUMENTS 5,656,178 A 8/1997 Marchesi et al.
7,288,136 B1 10/2007 Gray et al.
(Continued)

FOREIGN PATENT DOCUMENTS

CN 102198360 A 9/2011
DE 1960217 A1 6/1971
(Continued)

OTHER PUBLICATIONS

International Search Report of PCT/EP2021/063941 dated Aug. 3, 2021 [PCT/ISA/210].
(Continued)

*Primary Examiner* — Gabriel E Gitman
(74) *Attorney, Agent, or Firm* — Sughrue Mion, PLLC

(57) ABSTRACT

A method for separating gaseous carbon dioxide from a gas mixture by cyclic adsorption/desorption using a sorbent material adsorbing said gaseous carbon dioxide, wherein the method comprises the following sequential and in this sequence repeating steps:
(a) an adsorption step;
(b) and isolating step;
(c) injecting a stream of saturated or superheated steam and thereby inducing an increase in internal pressure of the reactor unit and an increase of the temperature of the sorbent from ambient atmospheric temperature to a temperature between 60 and 110 °C, starting the desorption of CO2;
(Continued)

(d) extracting at least the desorbed gaseous carbon dioxide from the unit and separating gaseous carbon dioxide from water by condensation in or downstream of the unit, while preferably still injecting;
(e) bringing the sorbent material to ambient atmospheric pressure conditions and ambient atmospheric temperature conditions.

36 Claims, 11 Drawing Sheets

(51) Int. Cl.
*B01D 53/26* (2006.01)
*B01D 53/02* (2006.01)

(52) U.S. Cl.
CPC ........ *B01D 53/0454* (2013.01); *B01D 53/047* (2013.01); *B01D 53/265* (2013.01); *B01D 2256/22* (2013.01); *B01D 2257/504* (2013.01); *B01D 2258/0283* (2013.01); *B01D 2259/40007* (2013.01); *B01D 2259/40028* (2013.01); *B01D 2259/40052* (2013.01); *B01D 2259/4009* (2013.01); *Y02C 20/40* (2020.08)

(56) References Cited

U.S. PATENT DOCUMENTS

| | | | | |
|---|---|---|---|---|
| 8,500,854 | B1 | 8/2013 | Pennline et al. | |
| 2007/0149398 | A1 | 6/2007 | Jones et al. | |
| 2011/0088550 | A1 | 4/2011 | Tirio | |
| 2011/0179948 | A1 | 7/2011 | Choi et al. | |
| 2011/0296872 | A1 | 12/2011 | Eisenberger | |
| 2013/0312606 | A1* | 11/2013 | Eisenberger | B01D 53/18 96/121 |
| 2014/0010719 | A1* | 1/2014 | Eisenberger | B01D 53/08 422/178 |
| 2014/0096684 | A1 | 4/2014 | Ogino | |
| 2014/0130670 | A1 | 5/2014 | Eisenberger et al. | |
| 2015/0010452 | A1 | 1/2015 | Elliott et al. | |
| 2015/0209718 | A1 | 7/2015 | Eisenberger | |
| 2016/0023157 | A1* | 1/2016 | Matthias | B01D 53/0462 95/96 |
| 2016/0074803 | A1 | 3/2016 | Gebald et al. | |
| 2017/0203249 | A1* | 7/2017 | Gebald | B01D 53/62 |
| 2018/0214822 | A1 | 8/2018 | Eisenberger | |
| 2018/0272266 | A1 | 9/2018 | Sprachmann et al. | |

FOREIGN PATENT DOCUMENTS

| | | | |
|---|---|---|---|
| DE | 2352075 | A1 | 3/1975 |
| DE | 3030967 | A1 | 3/1982 |
| DE | 4030416 | A1 | 4/1992 |
| EP | 2874727 | A1 | 5/2015 |
| GB | 1296889 | A | 11/1972 |
| WO | 2012/016807 | A1 | 2/2012 |
| WO | 2013/166432 | A1 | 11/2013 |
| WO | 2014/063046 | A1 | 4/2014 |
| WO | 2016/005226 | A1 | 1/2016 |
| WO | 2016/037668 | A1 | 3/2016 |
| WO | 2016/038339 | A1 | 3/2016 |
| WO | 2019/238488 | A1 | 12/2019 |

OTHER PUBLICATIONS

Written Opinion of PCT/EP2021/063941 dated Aug. 3, 2021 [PCT/ISA/237].

* cited by examiner

METHODS AND DEVICES FOR STEAM DRIVEN CARBON DIOXIDE CAPTURE

CROSS REFERENCE TO RELATED APPLICATIONS

This application is a National Stage of International Application No. PCT/EP2021/063941 filed on May 25, 2021, claiming priority based on European Patent Application No. 20176843.9 filed on May 27, 2020 and European Patent Application No. 20176846.2 filed on May 27, 2020.

TECHNICAL FIELD

The present invention relates to a method for efficient carbon dioxide capture, in particular for efficient regeneration and drying of the carbon dioxide adsorber. It furthermore relates to devices for carrying out such a method, as well as to uses of such devices.

PRIOR ART

Gas separation by adsorption/desorption processes, more specifically the capture of carbon dioxide from atmospheric air, which is known as direct air capture (DAC), is a field of growing importance as a potential measure aimed at reducing the impact of greenhouse gases. The conditioning of atmospheric air and CO2 during adsorption is generally not a feasible option energetically at the prevalent CO2 concentrations and adsorption conditions. However, the conditions that lead to desorption of CO2 from the sorbent are significantly more varied and complex—these are generally based on the broad knowledge base of other industries in the gas separation field. Widely established capture of CO2 from flue gases can generally rely solely on a substantial change in CO2 partial pressure or system temperature to initiate a release of CO2 by the sorbent. DAC must however combine various measures of shifting the sorbent CO2 uptake equilibrium to achieve economically attractive working capacities. Therefore, newer methods specifically for the purpose of desorption in direct air capture processes have emerged and continue to emerge.

Previous methods have provided energy to the sorbent by various other means, such as US-A-2017203249, US-A-2016074803, where the desorption methods typically combine temperature swings realized with heat exchangers with vacuum swings and steam purge gas flows. However—while conductive heating can be easily controlled, avoids near saturation instabilities (i.e. wet steam) and does not load sorbent materials with large amounts of liquid water-conductive heat transfer through typical granular beds of highly porous sorbents materials is commonly very poor. Furthermore, the heat exchangers displace sorbent material, thus considerably reducing output per unit volume. Extensive heating and drying of the sorbent in this manner has also been shown to cause substantial degradation to the sorbent material, reducing CO2 uptake capability and leading to an overall reduction in the sorbent operational lifetime. In combination with their high cost, such solutions are not necessarily economically feasible for the widespread application of DAC. Usage of steam for the regeneration of sorbents is not new, dating back several decades, such as indicated by GB1296889A or DE3030967A1. However, in an attempt to overcome the aforementioned issues for purposes of direct air capture, pure steam desorption processes have received increased attention in this field in recent years, see US-A-2014096684, US-A-2018214822, WO-A-2016038339, US-A-2011088550, WO-A-2014063046, US-A-2011179948, US-A-2015209718, EP-A-2874727, US-A-2007149398, US-A-2014130670, U.S. Pat. No. 7,288,136, WO-A-2016037668, US-A-2018272266 or U.S. Pat. No. 8,500,854. These are generally reference steam processes from other industries where both saturated and superheated steam is used for the regeneration of sorbents. Steam desorption methods allow for fast and uniform heating of the sorbent, with the innate drawback of substantial deposition of water in the sorbent materials, where these considerable amounts of additional water may impede the continued successful cycling of the material for the purpose of CO2-capture. The addition of water may reduce the transport kinetics in porous sorbent materials, or potentially wash out the active phase rendering the sorbent material inactive for further capture of $CO_2$. The key to effective operation is therefore the combination of a process and sorbent material that allows for cyclic operation of the direct air capture plant.

Devices for such a process have been disclosed. Aside from introducing steam from an external source into the reaction chamber, previously disclosed devices for such a desorption technique disclose, for example, a steam generation reservoir inside the sorbent chamber (US-A-2014096684, WO-A-2016005226) or describe the reuse of steam within a limited number of reaction chambers (US-A-2013312606).

The aspects relevant to cyclic operation include the conditions of adsorption, any preparation prior of the regeneration, the temperature and pressure level of regeneration as well as the conditions of the steam employed, and any post-regeneration steps. While some process-oriented disclosures describe a reduction of pressure or alternatively purge of air from within the reaction chamber (EP-A-2874727, WO-A-2016037668, US-A-2011296872), most leave this unaddressed. The condition of the steam employed is, if further disclosed at all, saturated steam (US-A-2013312606, U.S. Pat. No. 7,288,136).

The sorbent temperature during regeneration is of particular importance, as many common CO2 sorbent systems show a rapid reduction in cyclical CO2 capture capacity due to degradation, primarily driven by the exposure to sufficiently high temperatures and oxidation by the exposure to oxygen at sufficiently high temperatures. On the other hand, higher temperatures, in most sorbents, facilitate faster desorption rates and higher CO2 desorption amounts.

WO-A-2019238488 discloses a method for separating gaseous carbon dioxide and water from a gas mixture by cyclic adsorption/desorption using a sorbent material adsorbing said carbon dioxide. The document proposes using a unit containing an adsorber structure, and the process comprises the following repeating steps: (a) contacting said gas mixture with said sorbent material in an adsorption step; (b) at least one of evacuating said unit and heating said sorbent material in a desorption step and extracting the gaseous carbon dioxide and water vapour and separating gaseous carbon dioxide from water vapour downstream of the unit; (c) cooling the adsorber structure with said sorbent material and re-pressurisation of the unit; wherein (i) in step (c) the heat released is recovered and stored in a first heat storage device; (ii) during step (b) at least one of the sensible and latent heat of gaseous carbon dioxide and water vapour as product gases is recovered and stored in second heat storage device; and (iii) wherein during step (b) the heat required for heating said sorbent material in said unit is supplied from heat recovered in at least one of step actions (i) and (ii) of previous sequence(s) of said unit. There is no disclosure of steam injection for increasing the temperature to the range of 60-110 °C actually starting desorption, and then to continue with steam injection and start extraction.

WO-A-2016005226 also discloses a method for separating gaseous carbon dioxide from a mixture containing said gaseous carbon dioxide as well as further gases different from the gaseous carbon dioxide by cyclic adsorption/desorption using a sorbent material adsorbing said gaseous carbon dioxide. The method is using a unit containing an adsorber structure with the sorbent material, and the method comprises the following sequential and in this sequence repeating steps: a) contacting said gas mixture with the sorbent material to allow said gaseous carbon dioxide to adsorb on the sorbent material under ambient atmospheric pressure conditions and ambient atmospheric temperature conditions in an adsorption step; b) evacuating the unit to a pressure in the range of 20-400 mbarabs and heating said sorbent material in the unit to a temperature in the range of 80-130 °C in a desorption step; c) re-pressurisation of the unit to ambient atmospheric pressure conditions and actively cooling the sorbent material to a temperature larger or equal to ambient atmospheric temperature; wherein in step (b) steam is injected into the unit to flow-through and contact the sorbent material under saturated steam or superheated steam conditions at the pressure level in said unit, and wherein the molar ratio of steam that is injected during the entire step (b) to the gaseous carbon dioxide released in the entire step (b) is less than 20:1. Also in this document there is no disclosure of steam injection for increasing the temperature to the range of 60-110 °C and increasing the pressure actually starting desorption, and then to continue with steam injection and start extraction.

US-A-2015010452 relates to a circulating moving bed and process for separating a carbon dioxide from a gas stream. The circulating moving bed can include an adsorption reactor and a desorption reactor, and a sorbent that moves through the two reactors. The sorbent can enter the adsorptive reactor and one end and move to an exit point distal to its entry point, while a CO2 feed stream can enter near the distal point and move countercurrently through the sorbent to exit at a position near the entry point of the sorbent. The sorbent can adsorb the CO2 by concentration swing adsorption and adsorptive displacement. The sorbent can then transfer to a regeneration reactor and can move countercurrently against a flow of steam through the regeneration reactor. The sorbent can be regenerated and the carbon dioxide recaptured by desorbing the carbon dioxide from the sorbent using concentration swing desorption and desorptive displacement with steam.

CN-A-102198360 relates to the field of separation of CO2 in flue gas discharged during a combustion process, and in particular relates to a process and equipment for removing CO2 in flue gas by utilizing an amine solid adsorbent. In the process, the CO2 gas in the flue gas is fully contacted with the amine solid adsorbent so that CO2 gas molecules are rapidly diffused into pores of the solid adsorbent to react with amine liquids in the pores and then the CO2 is rapidly adsorbed by the adsorbent, and meanwhile the amine solid adsorbent adsorbed with the $CO_2$ is regenerated by utilizing one or more regeneration methods such as thermal regeneration, vacuum regeneration, steam regeneration, amine steam regeneration and gas introduction regeneration. The adopted main equipment consists of a CO2 absorption reactor using the amine solid adsorbent, a regeneration reactor, a gas-solid separator, a gas-liquid separator and the like. The process and equipment provided allegedly have the advantages of simple and compact overall design, low investment and operating cost, stable and reliable operating performance and capability of efficiently separating the CO2 in the flue gas with low cost.

SUMMARY OF THE INVENTION

The present invention relates to a method for the regeneration of a sorbent used in a cyclical adsorption-desorption for the capture of carbon dioxide, CO2, directly from ambient atmospheric air, or flue gas, or greenhouse gas. One defining aspect is the essentially exclusive use or fully exclusive use of steam for the delivery of heating energy during the desorption process. In order to allow for efficient and economic cyclic operation, a multitude of further requirements as detailed above is preferably complied with.

The proposed method is a very specific and novel set of steps and operating conditions for economically viable DAC processes and sorbents is given. A technically functioning and economically viable method for the cyclic adsorption and desorption of a sorbent for CO2 capture using steam as an energy source for regeneration is made available.

According to the invention, a method for separating gaseous carbon dioxide from a gas mixture, containing said gaseous carbon dioxide as well as further gases different from gaseous carbon dioxide by cyclic adsorption/desorption using a sorbent material adsorbing said gaseous carbon dioxide, is proposed.

The method makes use of a unit containing an adsorber structure with said sorbent material, the unit being evacuable to a vacuum pressure of 400 mbarabs or less, and the adsorber structure being heatable to a temperature of at least 60 °C for the desorption of at least said gaseous carbon dioxide and the unit being openable to flow-through of the gas mixture and for contacting it with the sorbent material for the adsorption step.

Typically, this adsorber structure is a structure with chemical moieties allowing to adsorb carbon dioxide under ambient temperature and ambient pressure conditions, but releasing the carbon dioxide again if the pressure is reduced and/or the temperature is increased.

Possible systems are based on amine carrying sorbent beads in corresponding containers, but also particulate systems based on other capturing moieties, such as alkali carbonate systems on an active carbon carrier.

The proposed method at least comprises the following sequential and in this sequence repeating steps:

(a) Contacting said gas mixture with the sorbent material to allow at least said gaseous carbon dioxide to adsorb on the sorbent material under ambient atmospheric pressure conditions and ambient atmospheric temperature conditions in an adsorption step. This step is the flow-through adsorption step, typically carried out in a unit having two doors at opposite ends of the unit, which for this process step are both open. In the embodiments, this step is termed step (1).

(b) Isolating said sorbent with adsorbed carbon dioxide in said unit from said flow-through while maintaining the temperature in the sorbent and then evacuating said unit to a pressure in the range of 20-400 mbarabs. If carried out in a unit as described in the preceding paragraph, this means that in a first sub-step (in the embodiments termed step (2)) the two doors are first closed and then in a second sub-step a vacuum is applied (in the embodiments termed step (3)) within this step (b).

(c) Injecting a stream of saturated or superheated steam and thereby inducing an increase in internal pressure of the reactor unit and an increase of the temperature of the sorbent from normally ambient atmospheric temperature to a temperature between 6° and 110 °C, starting the desorption of $CO_2$. In the embodiments, this step is termed step (5).

What is important about this step (c) is that the heating of the sorbent is taking place exclusively by way of contact with this stream of saturated or superheated steam, there is no additional heat input such as for example by way of internal or external heat exchange elements or the like. The contact of the steam with the sorbent therefore at the same time leads to heating as well as starting of the desorption process.

In this step (c) there is no extraction of desorbed gaseous carbon dioxide from the unit, but only injection of said stream of saturated or superheated steam.

The conditions of the process are controlled such that in this step (c) by virtue of the injection of the stream of saturated or superheated steam the internal pressure of the reactor increases. The increase in pressure is for example due to the supercritical expansion of the steam in the reactor, and typically the pressure increase is controlled by adapting the valve and pump operation of the unit and/or the pressure and/or temperature level of the stream of saturated or superheated steam injected into the unit as is known to the skilled person.

For a typical process the pressure is increasing from the level as given in step (b) to a value in the range of 400 mbarabs to 1000 mbarabs. In this step (c) the outflow from the unit is controlled—for example by a valve, by switching between different piping diameters, by controlling the cooling performance of the condenser, by other means or a combination of methods-such that the pressure in the unit reaches a specified window or increases to the desired pressure at a controlled rate, by nature of having a larger inflow of steam than outflow if any.

During this step (c) steam can be injected in the form of fresh steam introduced by way of the corresponding inlet, however steam may also be recirculated from the outlet of steam, if need be, such a recirculation involving reheating of recirculated steam. If such steam recirculation takes place, the recirculated steam at least at the end of the process is not pure steam but carries desorbed carbon dioxide as well.

(d) Extracting at least the desorbed gaseous carbon dioxide from the unit and separating gaseous carbon dioxide from steam by condensation in or downstream of the unit. In the embodiments, this step is termed step (6).

During this step (d) preferably still saturated or superheated steam is injected into said unit and/or (at least partially) circulated through the unit as described above, thereby flushing and purging both steam and CO2 from the unit. The steam downstream of the unit is either condensed or circulated in step d), or only a portion of the steam downstream of the unit is circulated and the remainder is condensed.

As for the for the proposed possibility to recirculate, partly or completely, the steam during step (c) and/or (d) this is, independent of the above more specific steam desorption process, a further aspect of the present invention and will be detailed further below.

Step (d) occurs at a molar ratio of steam to carbon dioxide between 4:1 and 40:1 (calculated as total molar ratio of steam to carbon dioxide, i.e. the cumulative value over the full step, so taking the total steam and the total CO2 during the step), and is controlled so by regulating the extraction and/or steam supply to essentially maintain the pressure and/or temperature in the sorbent at the end of the preceding step (c).

Control of the molar steam/CO2 ratio in step (d) can, without particular efforts and based on monitoring of this ratio by corresponding sensors in the unit and/or upstream or downstream of the unit, be adapted by the corresponding inflow and pressure level/temperature level of steam introduced into the unit and the pump and valve operation of the unit. The ratio is also a function of sorbent properties and local steam flow. The given range refers to the conditions at which desorption is viable.

Typically, in this step (d) the temperature in the unit is maintained at a level which is in a window of ±20 °C from the temperature of the sorbent at the end of the preceding step (c), preferably in a window of ±10 °C or ±5 °C Alternatively or additionally, the process in step (d) is controlled in that the pressure in the sorbent at the end of the preceding step (c) is essentially maintained, which means that the pressure in the unit is maintained at a level which is in the window of ±0.2 bar, preferably in a window of ±0.1 bar from the pressure in the unit at the end of the preceding step (c). Regulation of the extraction and/or steam supply to essentially maintain the temperature in the sorbent at the end of the preceding step (c) and/or to essentially maintain the pressure in the sorbent at the end of the preceding step (c) is carried out in order to maintain the sorbent temperature under steam conditions and to facilitate ongoing release of CO2 at the above ratio.

Preferably, the desorption temperature in step (d) is controlled to be at least 75.8 °C, which corresponds to a steam saturation temperature of above 400 mbar.

In this step (d), the outflow from the unit is controlled—for example by a valve, by switching between different piping diameters, by controlling the cooling performance of the condenser, by other means or a combination of methods-such that the pressure and/or temperature in the unit remains in the previously specified window of pressure and/or temperature.

(e) Bringing the sorbent material to ambient atmospheric pressure conditions and ambient atmospheric temperature conditions, preferably by opening the doors of the adsorber structure in a first sub-step (in the embodiments termed step (8)) and by flushing with said gas mixture in the form of ambient air in a second sub-step).

In the context of this disclosure, the expressions "ambient atmospheric pressure" and "ambient atmospheric temperature" refer to the pressure and temperature conditions to that a plant that is operated outdoors is exposed to, i.e. typically ambient atmospheric pressure stands for pressures in the range of 0.8 to 1.1 barabs and typically ambient atmospheric temperature refers to temperatures in the range of −40 to 60 °C, more typically −30 to 45 °C Preferably the gas mixture used as input for the process is atmospheric air, which normally implies a CO2 concentration in the range of 0.03-0.06% by volume. However, also air with lower or higher CO2 concentration can be used as input for the process, e.g. with a concentration of 0.1-0.5% by volume, so generally speaking preferably the input CO2 concentration of the input gas mixture is in the range of 0.01-0.5% by volume.

Suitable and preferred sorbents for use in the present method have a process cyclical CO2 capacity in the range of 0.3 to 3 mmol/g and/or a water uptake of less than 70%. They can take the form of a solid material, which can be in the form of one or an assembly of contiguous layers/coatings or of particular nature (typically polymeric material), which is surface modified and/or porous to provide for carbon dioxide adsorption. The corresponding surface modification can be provided by impregnation, grafting and/or bonding of corresponding functionalities, in particular primary and/or secondary amine functionalities.

The sorbent material can be an amine-functionalized solid adsorbent or X2C03, wherein X is K, Na, Li or a mixture thereof, preferably impregnated onto a porous granular support, e.g. active carbon. For example, the material can be a weak-base ion exchange resin and/or amine-functionalized cellulose and/or amine-functionalized silica and/or amine-functionalized carbons and/or amine-functionalized metal organic frameworks and/or other amine-functionalized polymeric adsorbents. Another sorbent material suitable for use with this invention can be amine functionalized cellulose as described in WO2012/168346. Such sorbents can contain different type of amino functionalization and polymers, such as immobilized aminosilane-based sorbents as reported in U.S. Pat. No. 8,834,822 or materials according to WO-A-2011/049759 describing an ion exchange material comprising an aminoalkylated bead polymer for the removal of carbon dioxide from industrial applications.

Another possible sorbent is the one of WO-A-2016/037668 for reversibly adsorbing CO2 from a gas mixture, here the sorbent is composed of a polymeric adsorbent having a primary amino functionality. The materials can also be of the type as disclosed in EP 20 186 310.7 (incorporated by reference). Also, they can be of the type as disclosed in EP 20 181 440.7 (incorporated by reference), so materials where a solid inorganic or organic, non-polymeric or polymeric support material is functionalized on the surface with amino functionalities capable of reversibly binding carbon dioxide, with a specific BET surface area, in the range of 1-20 $m^2/g$. The solid inorganic or organic, non-polymeric or polymeric support material can be an organic or inorganic polymeric support, preferably an organic polymeric support, in particular a polystyrene based material, preferably a styrene divinylbenzene copolymer, preferably to form the sorbent material surface functionalized with primary amine, preferably methyl amine, most preferably benzylamine moieties, wherein the solid polymeric support material is preferably obtained in an emulsion polymerization process, or can be a non-polymeric inorganic support, preferably selected from the group consisting of: silica ($SiO_2$), alumina (Al2O3), titania (TiO2), magnesia (MgO), clays, as well as mixed forms thereof, such as silica-alumina (SiO2-Al2O3), or mixtures thereof.

The sorbent material generally, and/or in the above case the solid inorganic or organic, non-polymeric or polymeric support material, can be in the form of at least one of monolith, layer or sheet, hollow or solid fibres, preferably in woven or nonwoven structures, hollow or solid particles, or extrudates, wherein preferably it takes the form of preferably essentially spherical beads with a particle size (D50) in the range of 0.01-1.5 mm, preferably in the range of 0.30-1.25 mm, or the solid inorganic or organic, non-polymeric or polymeric support material is in the form of solid particles embedded in a porous or non-porous matrix.

According to a first preferred embodiment, after step (d) and before step (e) the following step is carried out:

(d1) ceasing the injection and, if used, circulation of steam, and evacuation of the unit to pressure values between 20-500 mbarabs, preferably in the range of 50-250 mbarabs in the unit, thereby causing evaporation of water from the sorbent and both drying and cooling the sorbent. In the embodiments, this step is termed step (7).

This step (d1) is a very preferred step, since it unexpectedly allows combining two effects in one single step: after the steam treatment the sorbent needs to be cooled down to ambient conditions again, but, more importantly, it also needs to be dried. This step allows the combination of these two features in one single processing step, which makes the process quicker and more economical.

In step (b) said unit is preferably evacuated to a pressure in the range of 20-400 mbarabs, or 100-200 mbarabs, while not heating the sorbent. During this step in principle already a first carbon dioxide fraction for certain sorbents can be extracted.

After step (b) and before step (c) the following step can be carried out:

(b1) flushing the unit of non-condensable gases by a stream of non-condensing steam while essentially holding the pressure of step (b), preferably holding the pressure of step (b) in a window of +50 mbarabs, preferably in a window of +20 mbarabs and/or holding the temperature of the reactor unit below 70 °C or below 60 °C, preferably below 50 °C. In the embodiments, this step is termed step (4).

In step (b1) the unit can preferably be flushed with saturated steam or steam overheated by at most 20 °C in a ratio of 1 kg/h to 10 kg/h of steam per kg of sorbent, while remaining at the pressure of step (b1), to purge the reactor of remaining ambient air.

Step (e) may preferably include breaking of the isolation of the unit to the ambient atmospheric air and drying of the sorbent with a stream of warm air, preferably having a temperature in the range of 40-100 °C, more preferably in the range of 60-80 °C. In the embodiments, this step is termed step (9).

In step (e) said stream of warm air is preferably at ambient pressure and 10 m3/h to 100 m3/h per kg of sorbent, and at a temperature between 40 °C and 90 °C, preferably between 60 °C and 80 °C, preferably until the sorbent water content lies below 15-30 weight %.

In step (c), steam can be injected in the form of fresh steam introduced by way of a corresponding inlet of said unit, and steam is recirculated from an outlet of said unit to said inlet, preferably involving reheating of recirculated steam, or by the re-use of steam from a different reactor.

In step (c) furthermore preferably the sorbent can be heated to a temperature in the range of 80-110 °C or 80-100 °C, preferably to a temperature in the range of 85-98 °C According to yet another preferred embodiment, in step (c) the pressure in the unit (preferably at the end of this step) is in the range of 500-1000 mbarabs, preferably in the range of 550-1000 mbarabs or 600-950 mbarabs. Preferred ranges of 650-700 mbarabs or 700-950 mbarabs, preferably in the range of 750-850 mbarabs.

In order to achieve an as energy efficient process as possible, it is, according to yet another preferred embodiment, possible to run the process in that at least a portion of a purge gas flow exiting the adsorber structure in step (d) is passing a heat exchanger in which at least a part of the steam contained in said purge gas flow condenses, preferably at the saturation temperature of the vapor pressure of the gas flow at the hot side of the heat exchanger, before the remaining gas flow continues to a vacuum pump and a CO2 production outlet, while on a cold side of said heat exchanger a flow of water is vaporized, normally at lower pressure and condensation temperature than that of the purge gas flow, and is preferably further compressed and added to a flow of freshly generated steam used preferably for a portion or the entire duration of the same or a next adsorber structure's desorption heat-up phase and/or a portion of said adsorber structure's purge phase.

In addition or alternatively, it is possible that at least a portion of a purge gas flow exiting the adsorber structure in step (d) is sent directly to a next adsorber structure that has already been evacuated for a portion or the entire duration of said next adsorber structure's desorption heat-up phase and preferably a portion of said adsorber structure's purge phase.

Further preferably, only one of either the direct re-use of purge gas flow in another adsorber structure or alternatively the recovery of latent heat in an external heat exchanger is implemented and the entire purge gas flow is sent only to the respective device.

A particularly efficient release and take out of carbon dioxide is surprisingly possible if the steam is passing the adsorber structure and the sorbent contained therein at a particularly elevated speed (typically while keeping the volume flow the same as in conventional processes). In line with this, according to another preferred embodiment in step (c) and/or in step (d) the flow velocity of the steam in the adsorber structure is above 0.05 m/s, preferably in the range of 0.1-0.4 m/s, more preferably in the range of 0.2-0.35 m/s.

This high-speed steam purge can be implemented very efficiently in that the steam in step (c) and/or (d) takes a different path to the flow of air during adsorption in step (a) in order to increase local steam velocity in the bed during desorption. Preferably and very efficiently, the overall flow paths of adsorption during in step (a) and during steam injection in step (c) and/or (d) can be chosen to be essentially orthogonal. This different path for adsorption and steam injection can be implemented in practice by having a unit with a housing structure which has a short flow through length along a first direction, which is the adsorption flow through direction, and which has a long flow through length along a second, preferably orthogonal direction, which is the desorption flow through direction for the steam. This in particular to make sure that the steam contacts as much as possible of the sorbent while passing through the unit. For this, the unit may have a large opening at two opposing ends of the adsorption flow through direction, which are open during adsorption, and which are closed during desorption, and smaller openings in opposing circumferential side walls of the unit for the desorption, which are closed during adsorption and which are open during desorption for passing the steam through for desorption in a direction orthogonal to the one during adsorption. In this fashion, only the desired flow path for either air or steam will be available during adsorption or desorption.

In step (d) the molar ratio of steam to carbon dioxide is typically in the range of 4:1-40:1, preferably in the range of 10:1-30:1, and further preferably the extraction and/or steam supply is regulated to maintain the temperature in the sorbent in a window of ±10 °C, preferably in the window of ±5 °C from the temperature at the end of the preceding step.

In step (c) steam, either saturated at the current pressure or overheated to between 80 °C to 120 °C, preferably between 95 °C and 110 °C, can preferably be introduced to the sorbent material at a ratio of 1 kg/h to 10 kg/h of steam per kg of sorbent in any given flow direction, until the prevalent pressure lies between 600 mmbar and 950 mbar, preferably between 800 mbar and 950 mbar, such that the sorbent temperature reaches values between 85 °C and 110 °C, preferably between 90 °C and 105 °C by adsorption and/or condensation of said steam on the sorbent material.

In step (c) the unit outlet can also be opened such that a fraction between 0-10% or 0.1-10%, preferably 1-5%, of the injected steam is used to flush the unit by leaving through the unit outlet thus purging the reactor of remaining ambient air while the sorbent material temperature is increasing. So the flushing step can be combined with the injecting steam step to a certain extent.

In step (a) typically adsorption of CO2 from said gas mixture occurs by forced convection of said gas mixture at flow rates of 20 m3/h to 200 m3/h per kg of sorbent of ambient air.

These values in particular apply for the sorbent systems as mentioned above, for example for a particulate or a layered sorbent bed having a density in the range of 200-1000 kg/$m^3$, preferably in the range of 250-750 kg/$m^3$, being arranged in stacks of layers of a thickness in the range of 5-50 mm, preferably 10-40 mm and distanced by distances in the range of 5-150 mm, preferably 10-120 mm.

Furthermore, the present invention relates to a device for carrying out a method as detailed above. Preferably, such a device comprises at least one unit containing an adsorber structure with said sorbent material, the unit being evacuable to a vacuum pressure of 400 mbarabs or less and the adsorber structure being heatable to a temperature of at least 80 °C for the desorption, comprising means for injecting steam into the unit to flow-through and contact the sorbent material under saturated steam or superheated steam conditions with a superheated steam temperature of up to 140 °C at the pressure level in said unit, the unit being openable to flow-through of the gas mixture across and/or through said sorbent material and for contacting it with the sorbent material for the adsorption step, and comprising no further internal or external heating means for heating the sorbent.

The embodiments of the present invention presented below describe the proposed method in terms of both compulsory and optional process steps, which a sorbent material is exposed to in a dedicated reaction unit. The process steps of the method for the preferred embodiments include:

1. CO2 capture by adsorption of CO2 onto the sorbent material by contacting the sorbent with sufficient amounts of ambient atmospheric air (adsorption step (a), mandatory).
2. Isolating the sorbent in the reactor from external ambient atmospheric air (isolation step (b), mandatory).
3. Establishing a pressure typically between 20-400 mbar in the reactor unit by means of evacuation (evacuation step within (b), mandatory).
4. Flushing the reactor unit of non-condensable gases by an initial flow of non-condensable steam while holding the pressure range of step 3 or not allowing the sorbent temperature to exceed 60 °C (flushing with steam step (b1), optional).
5. Injecting a stream of saturated or superheated steam at a temperature of typically at least 45 °C and inducing an increase in internal pressure of the reactor unit and an increase of the temperature of the sorbent to a temperature between 6° and 110 °C, preferably according to the saturation temperature for the current reactor pressure, facilitating the desorption and release of CO2 (heat up with steam step (c), mandatory).
6. Opening of the reactor unit outlet while still injecting steam, thus flushing and purging both steam and CO2 from the sorbent and reactor unit at a molar ratio of steam to CO2 between 4:1 and 40:1, while regulating the outflow in such a way to maintain to a degree the pressure achieved at the end of the previous step 5 (purge step with steam (d), mandatory.
7. After ceasing the injection of steam, Reduction of unit pressure to values between 50-250 mbar in the reactor unit by means of evacuation, which causes evaporation of water from the sorbent subsequently both drying and cooling the sorbent (vacuum cool/dry step (d1), optional, highly preferred).

8. Breaking the isolation of the reactor to the ambient atmospheric air and re-pressurizing the reactor unit if required (step of breaking isolation and re-pressurization (e), normally mandatory).
9. Drying of the sorbent with warm air between 40 °C and 100 °C (step of air drying (e1), optional).

Continue cyclic operation with step 1.

A schematic illustration of this sequence of steps is given in FIG. 1.

The adsorption step 1 (or step (a)) is characterized by the prevalent ambient conditions, most notably temperature and relative humidity. The CO2 uptake characteristics, that is both kinetics and equilibrium capacity, of most active phases is a function of these ambient conditions in the range generally associated with air capture—temperatures of −15 °C to 40 °C and relative humidity of 20% to 100%.

FIG. 2 shows exemplary equilibrium water uptake of two different sorbents during exposure to air with varying relative humidity.

FIG. 3 shows the amount, type and effect of water uptake on an exemplary sorbent Generally, amines used for CO2-capture show improved performance with decreasing temperature or increasing relative humidity.

FIG. 4 shows the increase in time required to remove CO2 from a sorbent particle with diameter dp, based on a qualitative 1D-model using either the diffusion coefficient for CO2 in steam or for CO2 in liquid water.

FIG. 5 shows a schematic realization of a reactor with the required inlets and outlets for the proposed method.

Potassium or sodium carbonate-based systems show improved performance with decreasing temperature and most notably very low relative humidity.

Another important aspect, besides the CO2-uptake performance, is the water uptake of the sorbent, by both the active phase and the support material. Most support materials, such as ion exchange resins, alumina silicates or active carbon, are highly porous in order to facilitate a large surface area for the grafting or impregnation with the active phase for CO2-capture and the exchange of CO2 with ambient air during adsorption. However, during adsorption, water vapor from ambient air equilibrates with the water captured by both the active phase by adsorption and the support material by pore condensation. The water content by sorbent weight percentage after adsorption may then range anywhere from 0% to more than 100%, depending on the material in use. This water potentially slows the diffusion of CO2 into or out of the sorbent compared to a dry material, increasing the duration of both the adsorption and desorption process step, therefore reducing plant per reactor output.

The sorbent water content after adsorption also presents an additional mass to be heated during desorption, requiring further loading with condensate steam, further worsening concerns pertaining to desorption energy requirement, desorption rate, or leaching of active phase out of the material. The water uptake characteristic of the sorbent material in adsorption is therefore a decisive factor in determining the operational parameters of the plant and setting up an economically feasible process.

FIG. 6 shows the decrease in performance below economically feasible values at high relative humidity of ambient air during adsorption—as measured on a pilot plant with an unsuited prior art process-sorbent combination.

The desorption steps (3-7) are characterized primarily by the condition of the steam introduced into the reactor chamber at the prevalent pressure, and the final temperature and pressure pairing attained at the end of desorption. The flow direction of steam may be different from the flow direction of ambient air during adsorption.

Steam may either be wet, saturated, or superheated. Wet steam is a two phase flow, where the steam is at saturation temperature at the prevalent pressure, but condensate steam in the form of liquid phase is also present in the flow.

Wet steam is generally undesirable for desorption, but might not be avoidable in large-scale implementations.

Saturated steam is at or very close to matching saturation temperature at the prevalent pressure and will condensate immediately on contact with a colder surface.

Superheated steam has a higher temperature than the saturation temperature at the prevalent pressure. Superheated steam will penetrate father into a cooler sorbent material or bed than saturated steam, as it needs to lose heat convectively before condensation occurs.

This current primary embodiment relies primarily on the heat of vaporization released during the condensation of steam (approximately 2250 kJ/kgH2O) on the sorbent to desorb CO2, the sensible heat taken up when cooling down superheated steam (approximately 2 kJ/kg/K) prior to condensation will represent only a few percent of the total energy delivered. The equation to determine the required energy and steam amount loaded onto the sorbent is determined by equating the differential change energy of the steam with the change in energy of the reactor:

$$\Delta E_{steam} = \Delta E_{reactor}$$

Here the change in energy of the steam can be represented as the sensible heat given to the reactor as superheated steam cools down $[(T_{steam}-T_{reactor})\cdot dm_{H2O}]$, and the heat of vaporization as the steam condensates $[\Delta h_{evap}\cdot dm_{H2O}]$, where $dm_{H2O}$ is the incremental amount of steam that cools down and condensates, increasing reactor water loading.

$$\Delta h_{evap}\cdot dm_{H2O} + (T_{steam} - T_{reactor})\cdot c_{steam}\cdot dm_{H2O}\big(m_{sorbent}\cdot c_{sorbent} + m_{reactor}\cdot c_{reactor} + m_{H2O}\cdot c_{H2O} + \Delta h_{DES}^{CO2}\cdot M_{CO2}\cdot K(T_{reactor})\cdot m_{sorb}\big)\cdot dT_{reactor}$$

The energy change of the reactor is given by the incremental increase of sensible heat of the dry sorbent $[m_{sorbent}\cdot c_{sorbent}\cdot dT_{reactor}]$ the reactor structure $[m_{reactor}\cdot c_{reactor}\cdot dT_{reactor}]$ the water loaded on the sorbent $[m_{H2O}\cdot C_{H2O}\cdot dT_{reactor}]$ energy required for desorption of $$CO2\big[\Delta h_{DES}^{CO2}\cdot M_{CO2}\cdot K(T_{reactor})\cdot m_{sorb}\cdot dT_{reactor}\big],$$

where $K(T_{reactor})$ is a sorbent specific function describing the release of CO2 as a function of the reactor temperature.

The equation describing the change in reactor water loading as a function of reactor temperature is then:

$$\frac{dm_{H2O}}{dT_{reactor}} = \frac{\left(m_{sorbent} \cdot c_{sorbent} + m_{reactor} \cdot c_{reactor} + m_{H2O} \cdot c_{H2O} + \Delta h_{DES}^{CO2} \cdot M_{CO2} \cdot K(T_{reactor}) \cdot m_{sorb}\right)}{\Delta h_{evap} + (T_{steam} - T_{reactor}) \cdot c_{steam}}$$

This equation can be integrated with the according boundary conditions to yield the water loading on the sorbent after desorption with steam to a specific temperature. Importantly, the required instantaneous change in water loading $$\frac{dm_{H2O}}{dT_{reactor}}$$

to neat up the sorbent is proportional to the current water loading $m_{H2O}$, indicating exponential growth of the total water requirement for the heat-up of water already on the sorbent. For example, 1.0 kg of sorbent with a heat capacity of 1.5 kJ/kg/K, and loaded with 10% water by weight after adsorption, and foregoing any additional reactor structure and CO2-desorption, will be loaded with 18.3% water by weight, an additional 8.3%, after being heated up by condensation of saturated steam from 10 °C to 100 °C In comparison, an initial loading of 20% or 30% will require an additional loading of 10.1% and 12.2% respectively-increasing energy demand by 21.7% and 47% respective to an initial loading of 10%. The energy required to heat water already on the sorbent can be quite substantial, as the heat capacity of water is approximately four times that of typical sorbent materials.

As pointed out above, the recirculation of steam is a further aspect of this invention, which is independent of the particulars of the steam desorption process as detailed above.

Preferably however, the recirculation of steam as described in the following is used in the context of the steam desorption process as detailed above.

According to this second independent aspect of this invention, it is the object to provide for an improved DAC process (and corresponding devices) involving a step of steam purge, in particular to a particularly efficient sorbent regeneration process involving for the efficient usage and indeed re-usage of supplied steam.

According to this aspect of the present invention, a sorbent material contained in a vessel is regenerated by contacting it with a flow of steam, preferably superheated steam, which at least partly stems from steam previously supplied to and extracted from a regeneration process taking place in the same or different vessel, wherein the re-used steam, which has already at least once circulated through the sorbent material, can be and normally will be in a mixture with desorbate gases. Herein, the condition of the steam is not explicitly specified, however it follows that for steam to be supplied to and to leave from a regeneration process it should not (or as little as possible) condense or be adsorbed in contact with the sorbent material. Thereby, the steam should have a saturation temperature in a mixture with the desorbate which is substantially equal to or preferably higher than the sorbent temperature, that the majority if not all of said steam will not undergo condensation or adsorption in contact with the sorbent material.

The invention according to this further aspect correspondingly proposes a method for separating gaseous carbon dioxide from a gas mixture, containing said gaseous carbon dioxide as well as further gases different from gaseous carbon dioxide (normally ambient air, but also flue gases, greenhouse gases, and the like) by cyclic adsorption/desorption using a sorbent material adsorbing said gaseous carbon dioxide. This by using a unit containing an adsorber structure with said sorbent material, the unit preferably being evacuable to a vacuum pressure of 400 mbarabs or less, and the adsorber structure being heatable to preferably a temperature of at least 80 °C for the desorption of at least said gaseous carbon dioxide and the unit being openable to flow-through of the gas mixture and for contacting it with the sorbent material for the adsorption step.

The proposed method according to this further aspect comprises at least the following sequential and in this sequence repeating steps (a)-(c):

(a) contacting said gas mixture with the sorbent material to allow at least said gaseous carbon dioxide to adsorb on the sorbent material under ambient atmospheric pressure conditions and ambient atmospheric temperature conditions in an adsorption step;
(b) evacuating said unit to a pressure typically in the range of 20-400 mbarabs and heating said sorbent material in said unit to a temperature preferably in the range of 80-130 °C in a desorption step and extracting at least the desorbed gaseous carbon dioxide from the unit and separating gaseous carbon dioxide from water by condensation in or downstream of the unit;
(c) bringing the sorbent material to ambient atmospheric pressure conditions and ambient atmospheric temperature conditions.

According to the proposed invention of this further aspect, in step (b) steam is injected into the unit to flow-through and contact the sorbent material under saturated steam or superheated steam conditions with a superheated steam temperature of up to 130 °C Furthermore, at least part of the steam having passed through the unit and carrying at least part of the carbon dioxide desorbed from the sorbent is circulated back into the (preferably same or also a different) unit for at least a second flow-through and contact with the sorbent material.

As pointed out above, the steam in this recirculation (also termed in the following circulation gas or circulation steam) preferably is not depleted of desorbate gas, i.e. from carbon dioxide, but is just circulated for (further) desorption of carbon dioxide from the sorbent material. In fact, upon first or repeated pass of the steam through the sorbent, this contact between steam and sorbent (with adsorbed carbon dioxide) will lead to at least partial carbon dioxide desorption from the sorbent. Therefore, the steam recirculated to pass a further time through the sorbent bed will (at least at a certain stage of the cycling process) carry at least part of the carbon dioxide desorbed from the sorbent in the previous or any preceding pass through the sorbent. Thereby the gas circulating essentially consists of a mixture of substantially steam and some amount of desorbed CO2 which will vary during the desorption process (as will be shown in the examples).

Therefore, a distinction is made between initial steam injected into the unit which is uniquely steam and steam in the circulation loop which will exist in a mixture with $CO_2$ stemming from desorption.

The unit for recirculation can preferably be the same unit from which the steam and CO2 has exited, it can however also be a different unit which is in the process of being regenerated.

According to a first preferred embodiment of this further aspect, steam having passed through the unit and circulated back into the unit (so steam carrying at least part of the carbon dioxide desorbed in the first pass) is subjected to a step of reheating, preferably to a temperature above 95 °C, particularly preferably to a temperature above 100 °C, and/or at a heating power at 100 °C of at least 0.05 kW/kg sorbent material preferably at least 0.2 kW/kg sorbent material.

According to another preferred embodiment of this further aspect, step (b) comprises at least one phase, in which there is uniquely circulation of steam (so of steam carrying at least part of the carbon dioxide desorbed in the first pass) and no steam exiting the system.

This means that all the steam and any desorbate gases exiting the unit is recirculated during this phase. If need be, additional steam is supplied again in the form of saturated steam or superheated steam with a superheated steam temperature of up to 130 °C. Typically the recirculation volume flow is significantly larger than the volume flow of this additional steam, typically the recirculation volume flow is at least 5 times or even at least 20 times as large as the additional steam volume.

The circulation volume flow of steam (i.e. steam carrying at least part of the carbon dioxide desorbed in the first or previous passes) can be in the range of 10-150 m3/h/kg sorbent, preferably 20-80 m3/h/kg sorbent under the pressure conditions of circulation.

The recirculation conduits are preferably dimensioned with a diameter of less than 650 mm, preferably less than 250 mm/500 kg of sorbent material and the heat exchanger preferably has a specific surface area of 0.1-1.5 m2/kg sorbent while further preferably having a maximum length not exceeding 3 m.

Preferably the circulation volume flow is in the range of more than 5'000 m3/h, preferably more than 10'000 or more than 15'000 m3/h.

A number of known steam regeneration methods combine the use of saturated and superheated steam, the latter being to an extent applied to the drying of substances (DE-A-3030967, DE-A-2352075, DE-A-4030416, DE-A-1960217). Compared to air, superheated steam has roughly double the heat capacity reducing the mass flow required for drying. Further, a potentially energy intensive separation of water and drying gas can be avoided while the released water from drying processes can be indeed reused as the drying medium. In this fashion, superheated steam has been applied in a circulating manner in WO-A-2012016807 and U.S. Pat. No. 5,656,178 wherein the steam arising from drying of the media has been reheated to the superheated state and reapplied to drying. In this fashion, the energy intensity of the drying process corresponds only to the sensible heat of the steam superheating and avoids the energy intensity of fresh steam generation.

The prior art methods utilizing circulation mentioned herein focus however on drying and treatment of simple, robust, water adsorbing media (i.e. soils) and do not consider the application of steam recirculation methods to the regeneration of a sorbent material and are not directly suitable to this use. Firstly, the prior art methods operate at steam temperatures exceeding those allowable for the regeneration of DAC sorbents. Further, the steam amounts used in these processes are significantly lower than those needed for effective desorption in a DAC process due to the high temperatures applied and the low enthalpy of certain treatment processes like the volatilization of hydrocarbon contaminants. Further still, the processes rely on significant steam release due to drying to increase the amount of sweep gas present. Desorption processes aimed at recovering a gas other than water should explicitly avoid drying to deliver the greatest energy amount to the recovery of the desired desorbate. Hereby a careful control of desorption conditions is required. Yet further, because the amounts of contaminants in the prior art (soils shown in U.S. Pat. No. 5,656,178) are between 10 and 100 times lower than the amounts of CO2 typically found on DAC sorbents, the release of such gases in combination with far greater steam amounts arising from drying leads to an overall improvement in sweep gas composition. In contrast, a non-drying desorption of a DAC sorbent will see a significant accumulation of the desorbate in a circulating sweep gas requiring a very good process control to attain the best desorption conditions while maintaining a reasonable energy demand. Finally, the proposed methods of recirculation—due to extensive drying procedures—have process times greater than two hours, which are typically in excess of what can be economically realized in DAC regeneration applications. This fact has consequences on the dimensioning of process equipment and operating costs.

Therefore, although the existing methods identify the benefits of steam recirculation, their proposed operation and dimensioning are not suitable to the regeneration of DAC sorbents.

The purpose of this disclosure of this further aspect is therefore to make available a device and method for the energy efficient and economically viable application of steam desorption to DAC sorbents utilizing the benefits of sweep gas recirculation.

Preferably, the gas mixture is air or flue gas preferably at ambient temperature and ambient pressure.

A regeneration method involving the circulation of steam with any desorbed gases of this further aspect has a number of benefits against prior art processes making use of uniquely one steam pass.

Firstly, the production of fresh steam can be strongly reduced which improves the energy demand of the process, the size of hardware and likewise the demands on possible heat recovery systems.

Secondly, the method allows the application of dry heat to desorption processes by means of convective heating using the circulating gases as the heat transfer fluid. This may be beneficial for certain sorbent classes where water contents must be exactly controlled.

Complementary to this second feature, where some drying of the sorbent is indeed necessary-periodically due to water accumulation or as a consequence of extreme weather events—the methods of superheated steam drying from the prior art could be applied in-situ to the regeneration process, reducing process time and complexity against sequential processes.

Finally, the method offers a significantly improved process flexibility as the circulation gas flow rate and heating input can be very finely and very rapidly adjusted to match the sorbent, environmental conditions (i.e. for amine sorbents, varying CO2 loading as a consequence of varying relative humidity) and process phase.

Further, due to the relatively low thermal energy demand of steam superheating against the production of fresh steam, the flow rate of circulating gas consisting of steam and any desorbed gases can be much higher correspondingly achieving a significantly higher partial pressure shift with a small absolute amount of steam present in the system. A downside of a superheated circulating gas flow is that all heat delivery for desorption or other processes to the sorbent is realized by a transfer of sensible heat from the gas to the sorbent.

Depending on the temperature limits of the regeneration process, the usable temperature difference between the maximum superheating temperature and the condensation of steam in the circulation gas flow may be low thereby requiring high volume flow rates. Further, the disclosed recirculation of gases should avoid drying where possible, thereby delivering the maximum thermal energy towards the regeneration of the desired desorbate (i.e. not water).

Correspondingly, diligent control of process temperature and pressure are important and thankfully alleviated, by the flexibility of the proposed method.

According to the invention of this further aspect, a flow of steam is supplied to a unit containing a sorbent to be regenerated wherein said steam is preferably superheated which can exist in a mixture with the desorbate gases and said steam including further desorbate is extracted from the said same unit and wherein at least a part of said extracted steam including desorbate gas is resupplied to the same or different unit by a circulation loop.

Known from the prior art are solutions which apply steam as a sweep gas wherein a certain unit of steam contacts a sorbent material before leaving the sorbent containing vessel and continuing for further processing but not passing the sorbent material for a second time.

This method is heretofore called 'single-pass'.

The method and device of this further aspect of this invention contacts sorbent more than once with a unit of sweep gas as steam due to the herein disclosed circulation loop. In this manner, the impact of the steam can be increased due to longer exposure to sorbent while reducing the energy demand of a regeneration process by not losing the once produced steam. In such methods, the concentration of a given desorbate from the regeneration process can rise with the number of passes of steam reducing the regenerative impact of each pass of a unit steam however reducing energy demand.

The circulation of steam in the regeneration of a DAC sorbent of this further aspect can therefore be realized in one (or a combination thereof) of possible variants herein called 'single fill', 'multi-pass/multi-fill' and 'continuous pass/continuous fill'.

The 'single fill' variant involves filling the complete void volume of a DAC unit and the circulation loop once with steam, holding said steam in the superheated state by circulating and heating it while exposing the sorbent material to said steam-actually consisting of steam and desorbed CO2-without the steam or desorbed CO2 leaving the DAC unit until the release of CO2 is completed at which point the mixture of superheated steam and released CO2 is extracted from the DAC unit and separated from one another.

The 'single fill' variant for applying steam as a sweep gas has by far the lowest energy demand—corresponding only to the steam mass contained in the DAC unit void volume—but is only suitable for rather low desorbate release. As will be shown in an example, any appreciable desorbate amounts accumulated in circulating steam shift the equilibrium to the right effectively stopping desorption.

Another possible variant—'multi-pass/multi-fill'—alleviates this limitation somewhat and involves injection of a first portion of steam and holding it in the superheated state by circulating and heating it and contacting it with the sorbent material so long as to desorb a first portion of CO2 upon which the mixture of steam and CO2 is extracted from the DAC unit and separated from one another before said outlet of the DAC unit is closed again and a next portion of superheated steam is injected into the DAC unit repeating the process.

The 'multi-pass/multi-fill' procedure can be repeated any number of times during a sorbent regeneration process and replenishes the steam to avoid the inhibitive effects of desorbate accumulation. However, the energy demand due to the repetitive fillings is increased against the 'single fill' variant Another possible variant of this further aspect is the 'continuous pass/continuous fill' wherein a first small stream of steam is injected into the DAC unit, a far larger stream of steam in a mixture with any desorbed CO2 is circulated and heated so that the steam achieves a superheated condition before being reinjected into the DAC unit and a continuous flow-slightly higher than the injected fresh steam flow—of resulting desorbed CO2 and steam is extracted from the DAC unit and separated from one another.

This variant is an extreme case of the 'multi-fill/multi-pass' and further improves the composition of the circulation gases by lowering the CO2 amount at the expense of energy demand for higher steam production. It follows that the various modes of this further aspect can be combined and that the parameters of each can be adapted to instantaneous conditions of desorption of the sorbent. The essential trade-off to consider with these variants is that of steam usage and energy efficiency versus CO2-yield and product gas quality.

In a further aspect of this preferred embodiment of this further aspect, during circulation the instantaneous molar ratio of steam to carbon dioxide in the circulation loop is at least 3:1 or at least 5:1, preferably at least 10:1, most preferably at least 12:1, and particularly preferably in the range of 10:1-15:1 wherein the ratio can be maintained by the extraction of said gas from the regeneration process and the injection of fresh steam to the regeneration process.

Preferably and more generally, the ratio of total steam applied to total desorbate released can lie in the range of 80:1-3:1, preferably 45:1-6:1 more preferably 20:1-10:1.

Herein, the steam ratios are defined as the total amount (mol) of applied steam to the total amount (mol) of released desorbate. Higher steam ratios shift the equilibrium point to the left and achieve higher cyclic capacities however require a higher infrastructure and operational investment for steam supply and generation.

The herein disclosed circulation allows the optimization of the energy demand and process output by changing these ratios.

In a further embodiment, the saturation temperature of the steam in circulation is preferably less than 40 °C higher preferably less than 20 °C higher than the sorbent temperature at the pressure of regeneration of the sorbent which can lie between 100 and 1500 mbar (a) preferably between 600 and 1200 mbar (a) and wherein the maximum steam temperature is less than 140 °C. The importance of respecting this limit stems from the onset of drying which may be present in a given regeneration process which can for certain sorbents be—in terms of energy and output-disadvantageous. Further, due to the accumulation of desorbate in the steam in circulation, the partial pressure of water will sink under a constant total pressure requiring correspondingly a reduction in the circulation gas temperature to respect the herein disclosed limits. Finally, amine functionalized solid sorbents typical for DAC will be irreversibly damaged by temperatures higher than those herein specified.

According to yet another preferred embodiment, step (b) comprises at least one phase (S2), in which fresh steam is introduced into the unit and at the same time steam is recirculated without extraction of gas from the unit and preferably under increase of the pressure in the unit, and at least one phase (S3) involving extraction of gas from the unit under continued recirculation of steam and preferably under decreasing supply with fresh steam.

According to a further preferred embodiment, step (b) is controlled based on at least one of the following parameters:

temperature of the circulated steam at the outlet and/or the inlet of the adsorber structure, pressure of the circulated steam at the outlet or the inlet of the adsorber structure, composition of the circulated steam at the outlet and/or the inlet of the adsorber structure, temperature of the sorbent or a combination thereof.

Further preferably, the composition of the circulated steam can be used as a parameter for determining how much fresh steam is introduced, and/or at which moment extraction of gas from the unit is started, and/or to which extent extraction of gas from the unit is taking place in combination with circulation and/or injection of steam.

According to yet another preferred embodiment, the temperature and/or the pressure of the circulated steam at the inlet of the adsorber structure is controlled, based on at least one of the temperature of the circulated steam at the outlet of the adsorber structure and the temperature of the of the sorbent, to avoid condensation of the steam and/or to avoid drying of the sorbent in the adsorber structure.

This can be achieved in that further preferably the temperature and/or the pressure of the circulated steam at the inlet of the adsorber structure is controlled such that the saturation temperature of the steam in the adsorber structure is at least as high as or preferably higher than the temperature of the of the sorbent in the adsorber structure (at essentially any place in the adsorber structure), preferably at least 5 °C preferably at least 10 °C higher than the temperature of the of the sorbent in the adsorber structure for avoiding condensation and/or such that temperature of the steam in the adsorber structure is at least as high as or preferably higher than the temperature of the of the sorbent in the adsorber structure (at essentially any place in the adsorber structure), namely at most 15 °C or 20 °C higher preferably at most 10 °C higher than the temperature of the of the sorbent in the adsorber structure for avoiding drying of the sorbent.

The invention of this further aspect further relates to a device for carrying out a method as described above.

Such a device of this further aspect is preferably comprising at least one unit containing an adsorber structure with said sorbent material, the unit being evacuable to a vacuum pressure of 400 mbarabs or less and the adsorber structure being heatable to a temperature of at least 80 °C for the desorption, comprising means for injecting steam into the unit to flow-through and contact the sorbent material under saturated steam or superheated steam conditions with a superheated steam temperature of up to 140 °C at the pressure level in said unit, the unit being openable to flow-through of the gas mixture across and/or through said sorbent material and for contacting it with the sorbent material for the adsorption step, and further comprising means (typically piping, channels, bridges, et cetera) for recirculating at least part of the steam having passed through the unit back into the unit for at least a second flow-through and contact of the sorbent material.

According to a preferred embodiment of such a device of this further aspect, the recirculating means comprise at least one heating element and/or at least one propulsion element.

The device of this further aspect may further comprise means for extracting the recirculated steam and/or carbon dioxide from the unit, and wherein further preferably the unit comprises sensors for controlling the recirculation process, in particular at least one of the following: a sensor for sensing at least one of the pressure, the flow rate, and the temperature of the recirculated steam, a sensor for measuring the temperature in the adsorber structure, a sensor for measuring the pressure in the adsorber structure, a sensor for measuring at least one of the flow rate and the composition of gas extracted from the unit.

Reintroduction of circulated steam into the unit of this further aspect preferably takes place at a side opposite to the one where it is exiting the unit. So in a further aspect of the preferred embodiment, the circulation loop is equipped with a conduit for transporting the steam in circulation and devices for propulsion and heating of the circulating steam and the means of propulsion can be a device having a high volume flow capacity at a moderate head such as an axial or radial blower and the heating means can be a heat exchanger and wherein all equipment can preferably withstand vacuum conditions.

In a further preferred embodiment of this further aspect, the propulsion device for circulating steam is a steam ejector. This device can be applicable and attractive for the continuous fill/continuous pass variant as the fresh steam supplied can provide the propulsion for the circulating gas without further mechanical energy investment.

According to a preferred embodiment of this further aspect, the conduits for recirculation are dimensioned with a diameter of less than 650 mm, preferably less than 250 mm/500 kg of sorbent material and the heat exchanger has a specific surface area of 0.1-1.5 m2/kg sorbent while having a maximum length not exceeding 3 m.

In a further preferred embodiment of this further aspect of the invention, the circulation conduit can be connected to a DAC unit containing a sorbent material or sorbent material structure in such as fashion that the extraction of steam occurs at a first extremity of the sorbent material structure and the reinjection of steam occurs at the opposite extremity of said structure and the steam passes through said sorbent material structure contacting it.

In a further preferred embodiment, steam can be passed through the adsorber structure in a direction orthogonal to or in counter flow or preferably parallel to the main flow of adsorbate or adsorbate carrying gas.

In a further preferred embodiment of this further aspect, point of extraction of steam can be placed at a higher point than the point of injection of sweep gas and the device for propulsion is upstream of the heat exchanger and a gas extraction system is attached to the DAC unit.

In a further preferred embodiment, and as also described further above in the context of the method, the temperature of the circulation steam and pressure of the regeneration process can be actively controlled by the heater and gas extraction system consisting of a vacuum system and needle valve to operate at steam temperatures of less than 20 °C higher preferably less than 10 °C higher than the sorbent temperature wherein further the flowrate of circulating steam is increased with decreasing steam temperature and wherein the composition of the extracted gases from the unit is actively measured to determine the saturation temperature of the steam.

Explicitly, from the pressure of the unit and the composition of the gas leaving the unit, the partial pressure of the steam and thereby the saturation temperature of the steam existing in a mixture with the desorbed CO2 can be determined. Thereby the temperature of the heat exchanger in the circulation can be dynamically varied during the desorption process to respect the above defined limits. Intrinsic to this control is the fact that the sorbent temperature matches substantially the steam saturation temperature. In this fashion, the temperature of the circulation gas is always adapted such that a balance is struck between drying and desorption. Too high temperatures will support desorption but drive strong drying of the sorbent while too low temperatures will prevent desorption. This process control is essential for the effective regeneration of sorbents while limiting or avoiding drying where possible and will be further explained in Example 4 and 5.

In a further preferred embodiment of this further aspect, the method and device can be applied to the regeneration of sorbents suitable for direct air capture being of the class of amine functionalized solids wherein the substrates can be silica, alumina, active carbon, polymers, clays in granular forms or as structured adsorbers.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

The following embodiments are all examples of successful cyclical operation. Differences between embodiments stem from differences in plant output requirements or operational constraints, differences in sorbent characteristics of the material in use—in particular water and CO2 uptake characteristics- and differences in the predominant ambient conditions at which step 1, adsorption, occurs.

Successful cyclical operation of the method requires the sorbent to maintain an economical cyclical CO2 capacity under all conditions. A central challenge is the operation of the adsorption/desorption cycle in a way that avoids excessive deterioration of the sorbent CO2 uptake capacity, caused by thermal or oxidative degradation of the sorbent or active phase, mechanical disintegration of the sorbent material, excessive water loading that impedes diffusion of CO2 into or out of the capture structure in both the adsorption and desorption steps, leaching and washing out of the active phase by liquid water formation or any combination of the above.

This is achieved by loading the sorbent with amounts of water that reduce the prevalence of any of the above issues to acceptable levels during the desorption steps 5 and 6, employing the required degree of vacuum cooling in step 7, and any necessary further cooling and drying with steps 8 or 9.

Working Embodiments

The following working embodiments given below are process variants run on a pilot plant for several months at the end of 2019. The pilot plant comprised six individual adsorber structures as reactor chambers. The reaction chambers had a volume of approximately 5 $m^3$, were outfitted with a suitable sorbent material (such as ion exchange resin with grafted amines), with each chamber loaded with between 300 kg to 700 kg of sorbent. The steam supply of up to 2000 kg/h was sufficient to allow desorption of one of the six chambers at any moment in time, while the other five were in adsorption. The structure setting the sorbent configuration within the reaction chambers as well as the closing mechanism for this arrangement of reaction chambers have been previously filed for patent application (PCT/EP 2020/059282, EP 19 181 818.6 and EP19 216 398.8). The prototype described, successfully conducted testing under real-life conditions of various sorbent-process variants, amassing a total of more than 250 cycles over all of the six reaction chambers. The first, second and third preferred embodiments described below as well as the results given in figures corresponding to these embodiments stem directly from this prototype series. The embodiments thereafter were subsequently successfully implemented on Climeworks mid-scale testing facility.

Figure 7:
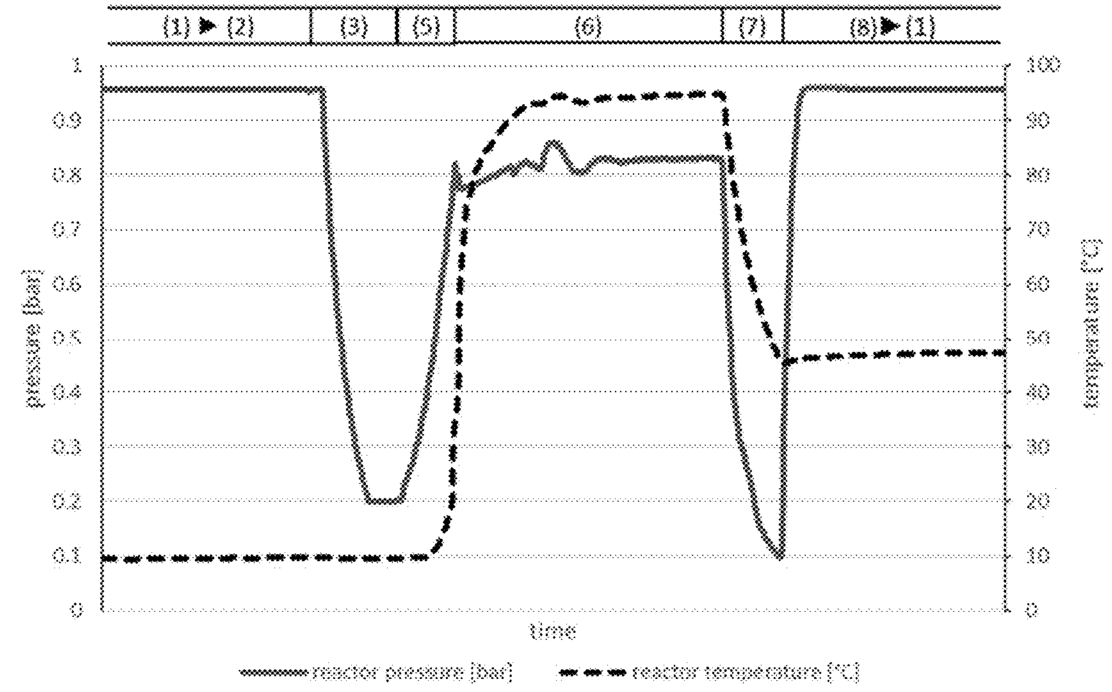
FIG. 7 shows reactor pressure and reactor temperature as measured during application of embodiment 1 of the method in a pilot prototype.
Figure 8:
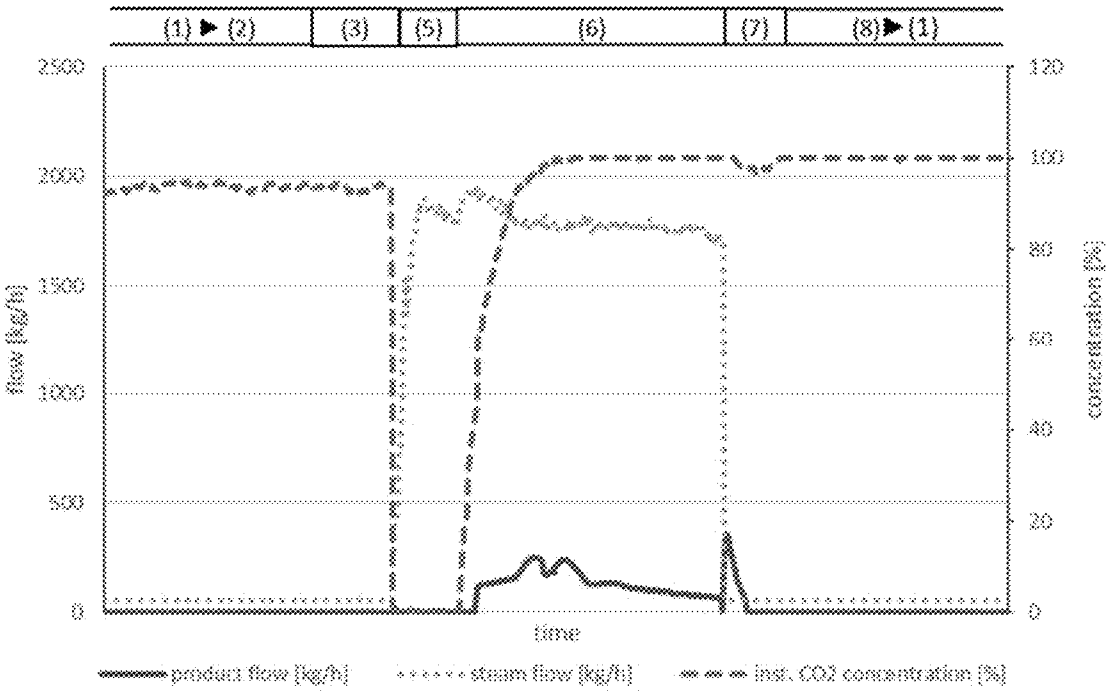
FIG. 8 shows steam and CO2 mass flows and product gas CO2 concentration as measured during application of embodiment 1 of the method in a pilot prototype.

A first preferred embodiment is described in conjunction with FIGS. 7 and 8. In this embodiment there is no step of flushing with steam (step (4)). FIG. 7 shows the reactor pressure and the reactor temperature as a function of time as measured during application of in the pilot prototype detailed further below, and FIG. 8 shows steam and $CO_2$ mass flows and product gas $CO_2$ concentration. The x-axis indicates the time, and represents one cycle of the method, typically a cycle takes between 60-180 minutes.

In this embodiment 1, sorbent is contacted with ambient air within the adsorption step 1 and then closed off from the ambient in step 2. The evacuation step 3 reduces the pressure with the chamber to below 250 mbar. The evacuation line is closed off and saturated or superheated steam is injected in the heating step 5 until a target temperature/pressure pair is reached within the reactor, between 85 °C and 110 °C The reactor outlet is opened and superheated steam is injected into the reactor in step 6 at the target pressure of step 5, between 600 mbar and 1500 mbar, to flush product $CO_2$ out of the sorbent material, with both steam and $CO_2$ leaving the reactor via the reactor outlet in a total molar $H_2O$ to $CO_2$ ratio between 4 and 40 to 1 for the entire step 6.

Once $CO_2$ release has been completed, the reactor is again evacuated to a pressure below 250 mbar in step 7, to remove remaining $CO_2$ and to recover water from the sorbent material and at the same time cool the sorbent material. The reactor is re-pressurized to ambient in step 8, and, subsequently, cyclic operation is resumed with the adsorption step 1.

Embodiment 1 is apt for sorbent materials and systems that require additional drying in step 7 to operate economically during adsorption. The required evacuation system can then be operated to evacuate the reactor in step 3 with the added benefit of improving $CO_2$ quality by the pre-emptive removal of air prior to desorption and the ability to also use steam at pressures below the ambient pressure.

Figure 9:
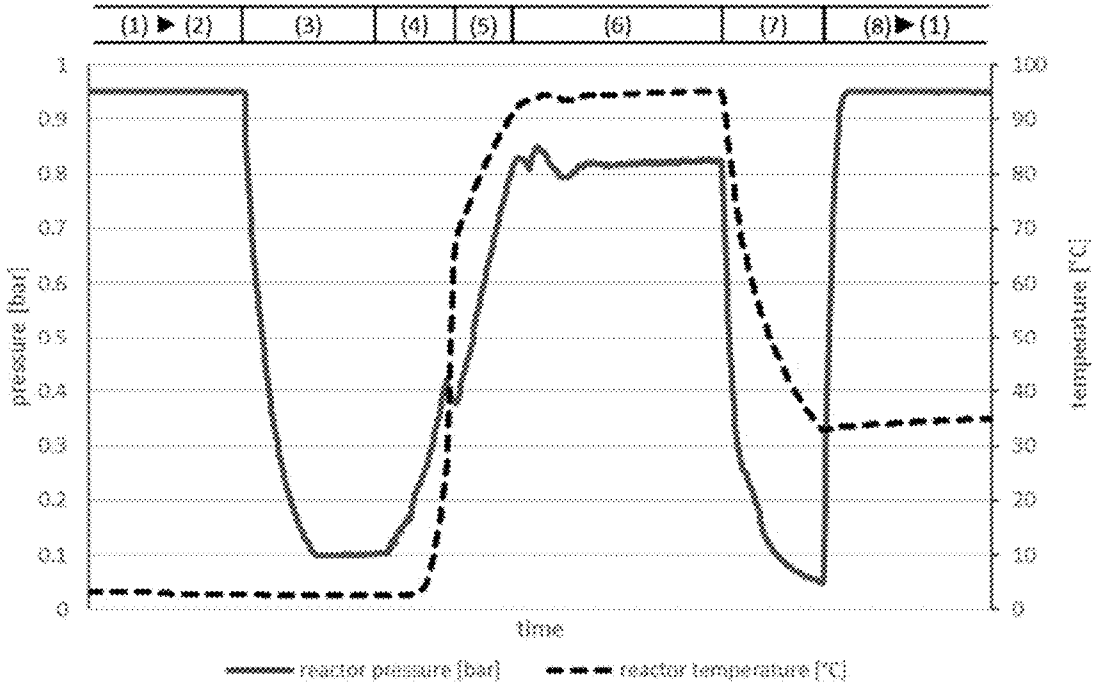
FIG. 9 shows reactor pressure and reactor temperature as measured during application of embodiment 2 of the method in a pilot prototype.
Figure 10:
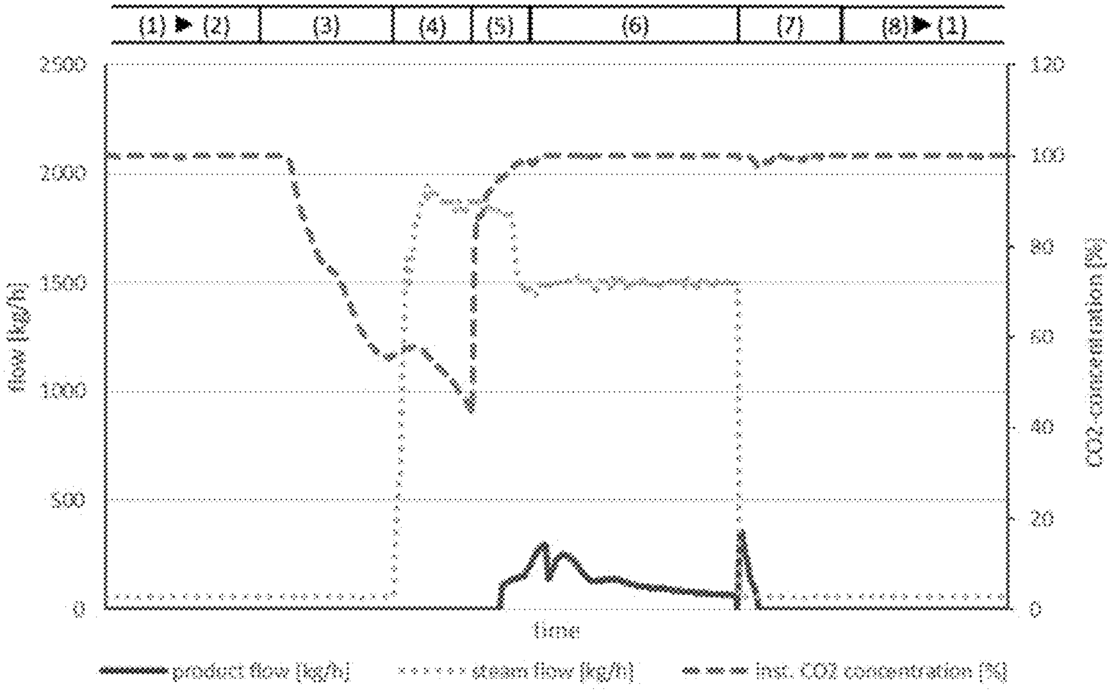
FIG. 10 shows steam and CO2 mass flows and product gas CO2 concentration as measured during application of embodiment 2 of the method in a pilot prototype.

A second preferred embodiment is described in conjunction with FIGS. 9 and 10. In this embodiment there is a step 4 of flushing with steam. FIG. 9 shows the reactor pressure and the reactor temperature as a function of time as measured during application of in the pilot prototype detailed further below, and FIG. 10 shows steam and $CO_2$ mass flows and product gas $CO_2$ concentration. The x-axis indicates the time, and represents one cycle of the method, typically a cycle takes between 60-180 minutes.

In this embodiment 2, sorbent is contacted with ambient air within the adsorption step 1 and then closed off from the ambient in step 2. The evacuation step 3 reduces the pressure with the chamber to below 250 mbar.

A flushing step 4 then introduces saturated or superheated steam while a similar amount is removed by the reactor outlet, thus maintaining to a degree the pressure attained at the end of the evacuation step 3, in order to remove remaining air from the reactor.

The evacuation line is closed off and saturated or superheated steam is injected in the heating step 5 until a target temperature/pressure pair is reached within the reactor, between 85 °C and 110 °C The reactor outlet is opened and superheated steam is injected into the reactor in step 6 at the pressure of step 5, between 600 mbar and 1500 mbar, to flush product $CO_2$ out of the sorbent material, with both steam and $CO_2$ leaving the reactor via the reactor outlet in a total molar $H_2O$ to $CO_2$ ratio between 4 and 40 to 1 for the entire step 6.

Once $CO_2$ release has been completed, the reactor is again evacuated to a pressure below 250 mbar in step 7, to remove remaining $CO_2$ and recover water from the sorbent material and at the same time cool the sorbent material. The reactor is re-pressurized to ambient in step 8, and, subsequently, cyclic operation is resumed with the adsorption step 1.

Embodiment 2 is apt for sorbent materials and systems that require additional drying in step 7 to operate economically during adsorption, the required evacuation system can then be operated to evacuate the reactor in step 3 with the added benefit of improving $CO_2$ quality by the pre-emptive removal of air prior to desorption and the ability to also use steam at pressures below the ambient pressure, while the flushing step 4 further improves $CO_2$ quality by the removal of even more air from the reactor, at the cost of increased steam and energy requirement.

Figure 11:
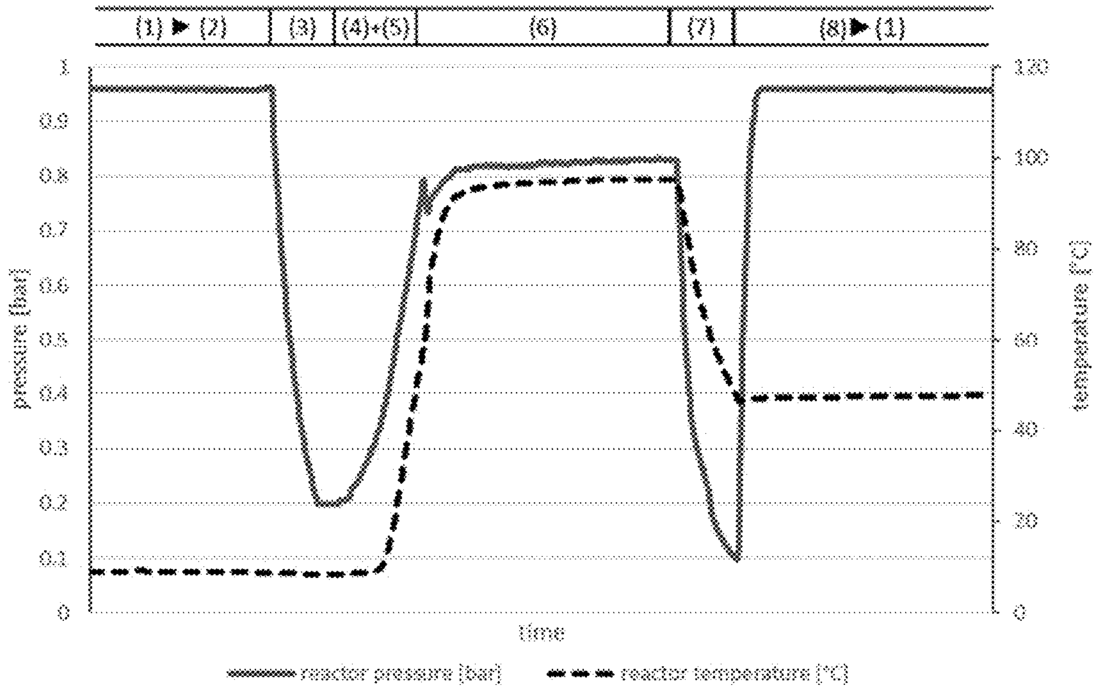
FIG. 11 shows reactor pressure and reactor temperature as measured during application of embodiment 3 of the method in a pilot prototype.
Figure 12:
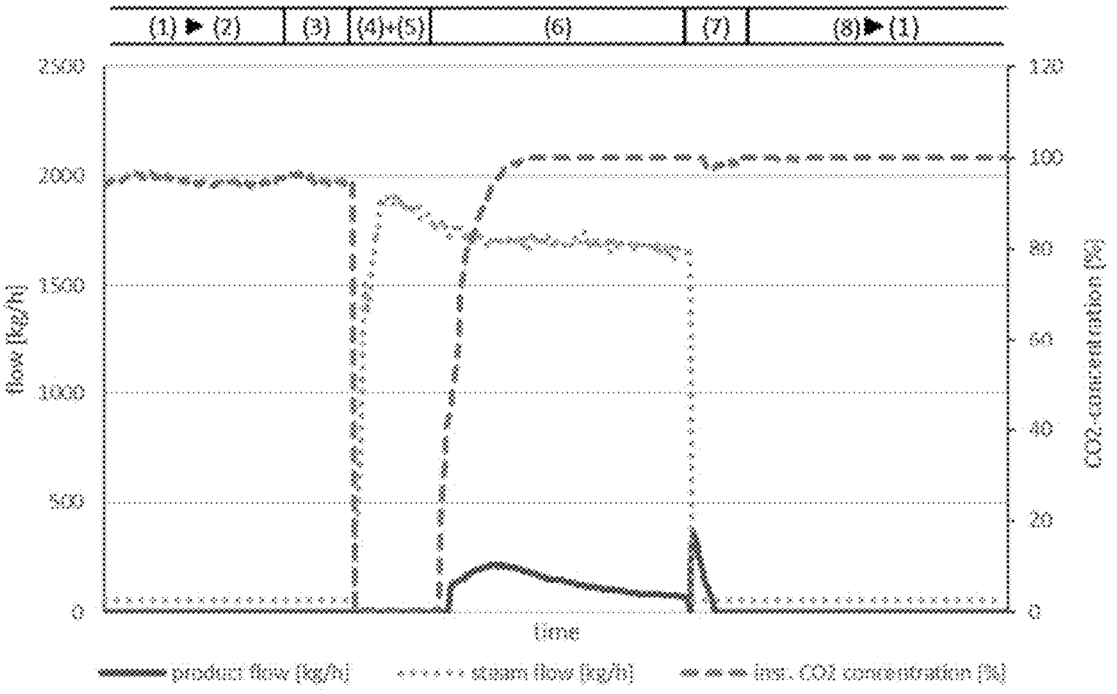
FIG. 12 shows steam and CO2 mass flows and product gas CO2 concentration as measured during application of embodiment 3 of the method in a pilot prototype.

A third preferred embodiment is described in conjunction with FIGS. 11 and 12. In this embodiment the step 4 of flushing with steam is combined with step 5 of heat up with steam. FIG. 11 shows the reactor pressure and the reactor temperature as a function of time as measured during application in the pilot prototype detailed further below, and FIG. 12 shows steam and $CO_2$ mass flows and product gas $CO_2$ concentration. The x-axis indicates the time, and represents one cycle of the method, typically a cycle takes between 60-180 minutes.

In this embodiment 3, sorbent is contacted with ambient air within the adsorption step 1 and then closed off from the ambient in step 2. The evacuation step 3 reduces the pressure with the chamber to below 250 mbar.

The flushing step 4 is incorporated in the heat-up step 5, by introducing saturated or superheated steam while a much lower flow is removed from the reactor outlet, thus causing an increase in reactor pressure and temperature until a target temperature/pressure pair is reached within the reactor, between 85 °C and 110 °C During the purge step 6, the reactor outlet flow is increased such that the same flow superheated steam is injected into and removed from the reactor, so maintaining the pressure at the end of step 5, between 600 mbar and 1500 mbar, while flushing product $CO_2$ out of the sorbent material, with both steam and $CO_2$ leaving the reactor via the reactor outlet in a total molar $H_2O$ to $CO_2$ ratio between 4 and 40 to 1 for the entire step 6.

Once $CO_2$ release has been completed, the reactor is again evacuated to a pressure below 250 mbar in step 7, to remove remaining $CO_2$ and recover water from the sorbent material and at the same time cool the sorbent material. The reactor is re-pressurized to ambient in step 8, and, subsequently, cyclic operation is resumed with the adsorption step 1.

Embodiment 3 is apt for sorbent materials and systems that require additional drying in step 7 to operate economically during adsorption, the required evacuation system can then be operated to evacuate the reactor in step 3 with the added benefit of improving CO2 quality by the pre-removal of air prior to desorption and the ability to also use steam at pressures below the ambient pressure, while the flushing incorporated into heat-up further improves CO2 quality by the removal of even more air from the reactor prior to CO2 release.

Embodiment 3, by combining the flushing and heating step, prevents introduction of steam into a closed reactor and any associated increase in pressure at any stage of the process and can therefore have an impact on safety considerations and future reactor design considerations.

Figure 1:
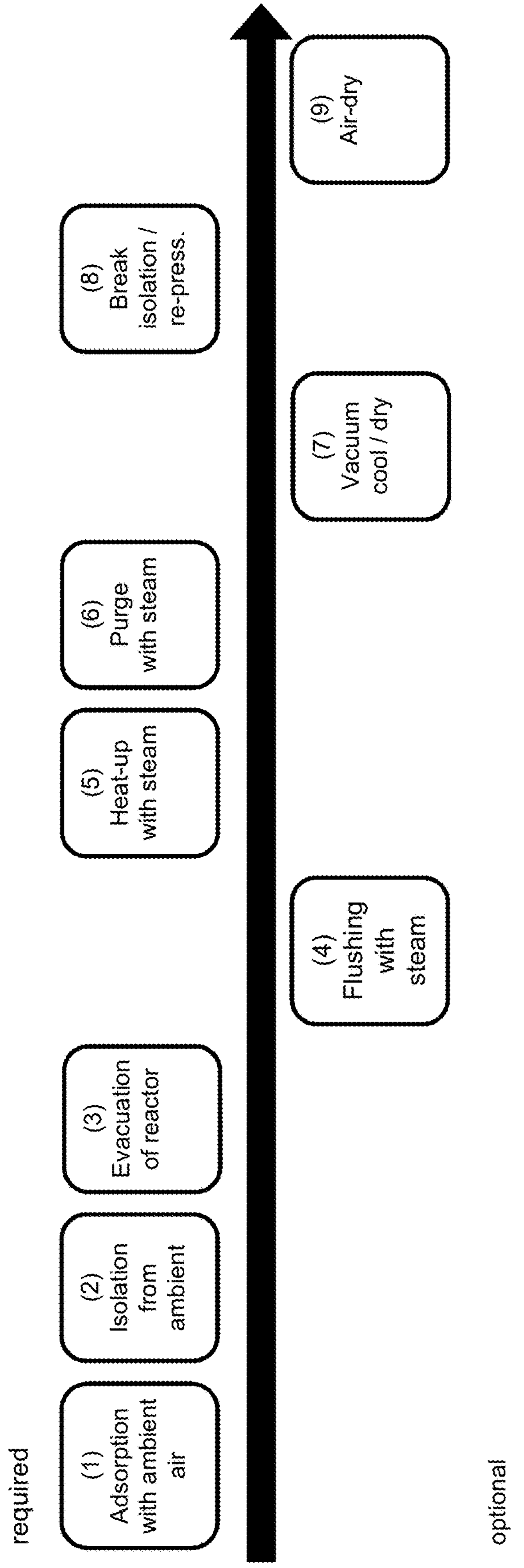
FIG. 1 shows a schematic representation of required and optional steps for the method presented to attain CO2 in an economically feasible cyclic adsorption and desorption process.
Figure 2:
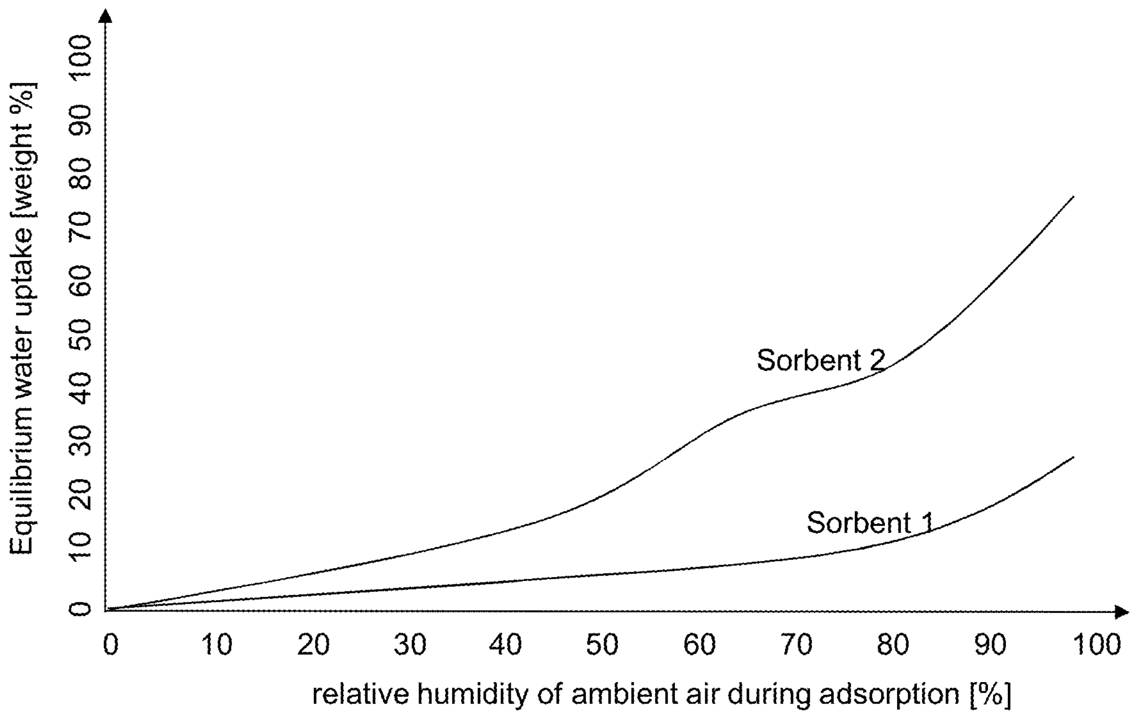
FIG. 2 shows exemplary equilibrium water uptake of two different sorbents during exposure to air with varying relative humidity.
Figure 3:
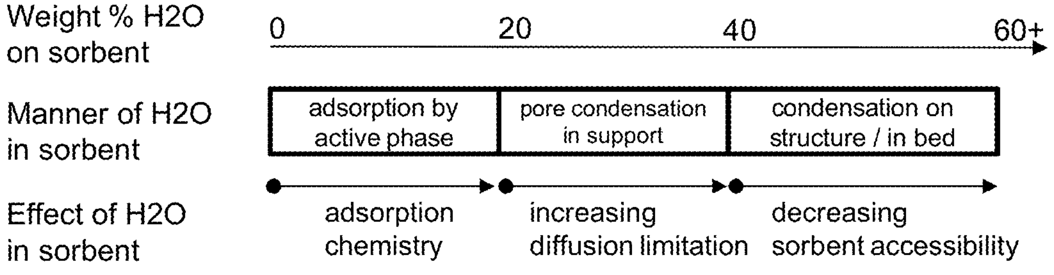
FIG. 3 shows the amount, type and effect of water uptake on an exemplary sorbent.
Figure 4:
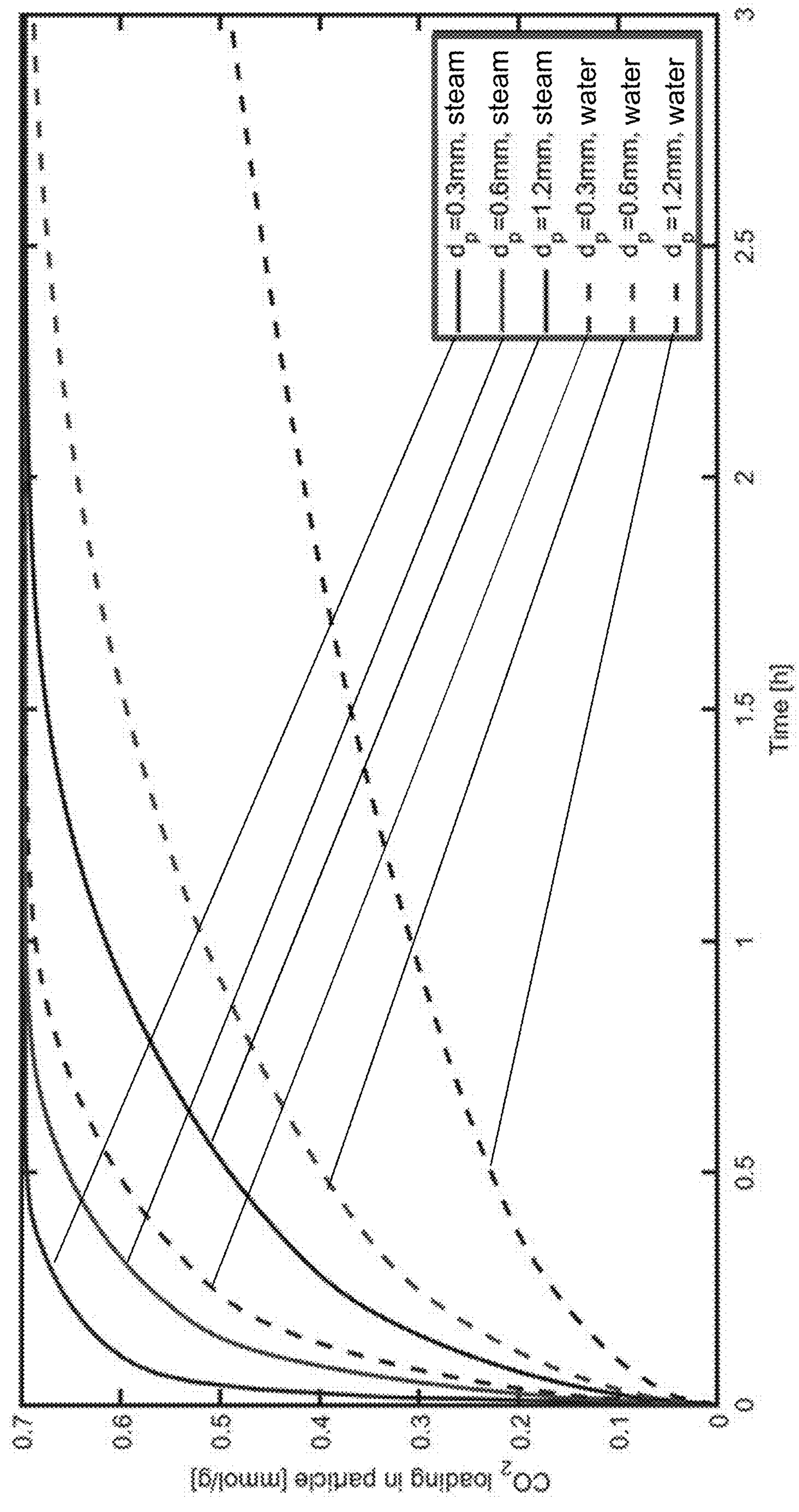
FIG. 4 shows the increase in time required to remove CO2 from a sorbent particle with diameter dp, based on a qualitative 1D-model using either the diffusion coefficient for CO2 in steam or for CO2 in liquid water.
Figure 5:
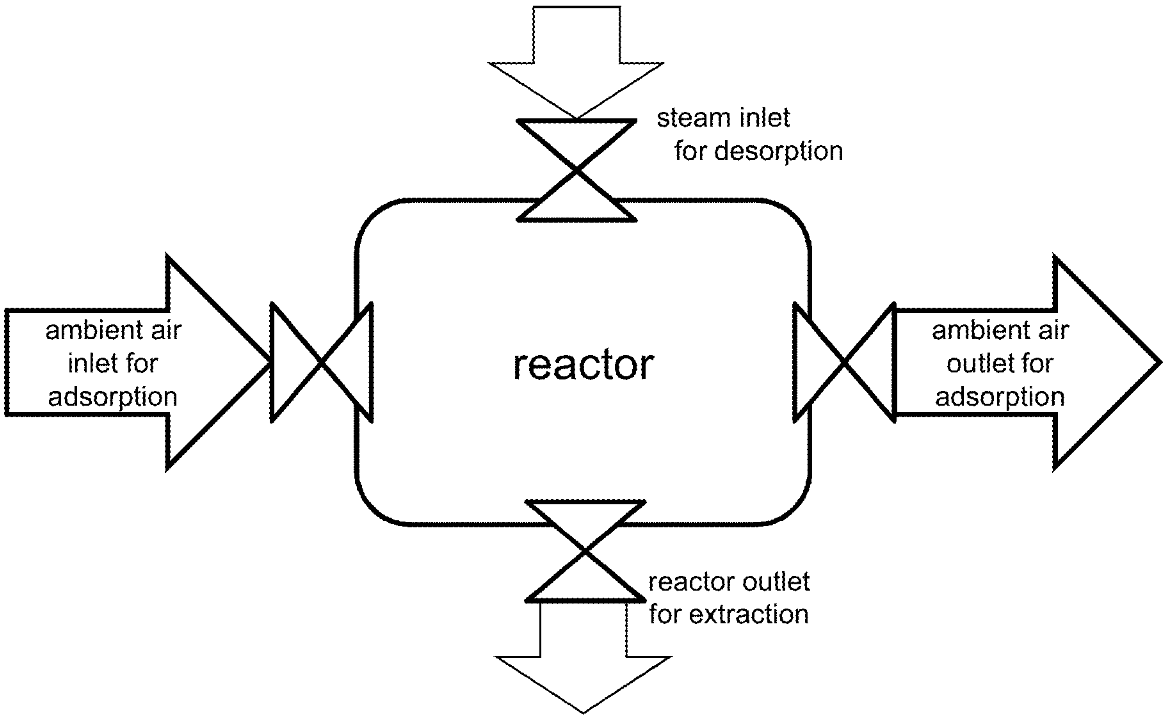
FIG. 5 shows a schematic realization of a reactor with the required inlets and outlets for the method presented.
Figure 6:
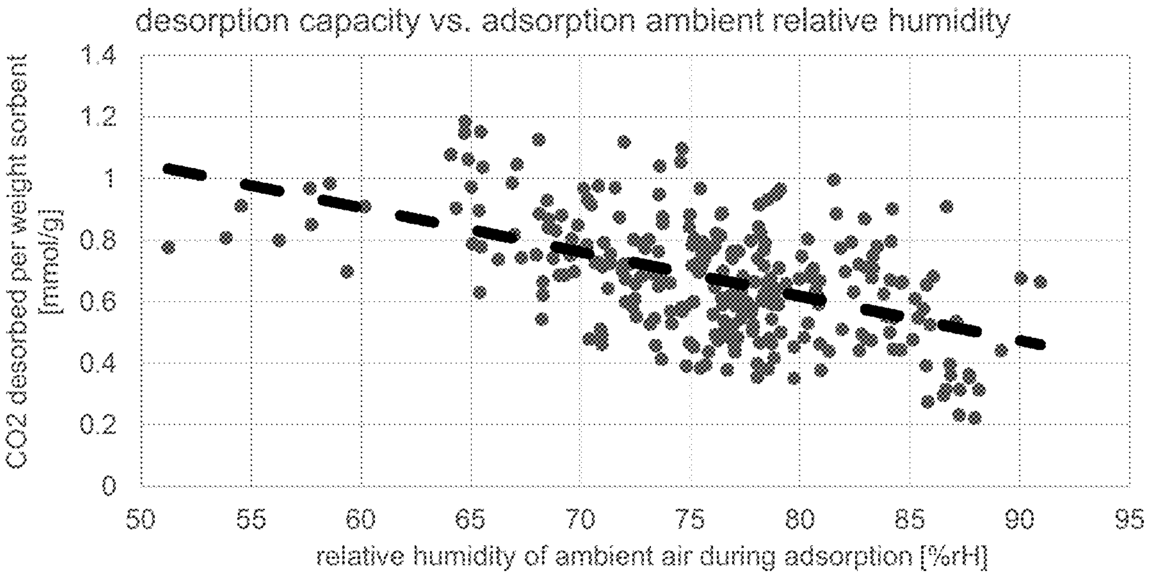
FIG. 6 shows the decrease in performance below economically feasible values at high relative humidity of ambient air during adsorption—as measured on a pilot plant with an unsuited prior art process-sorbent combination.
Figure 13:
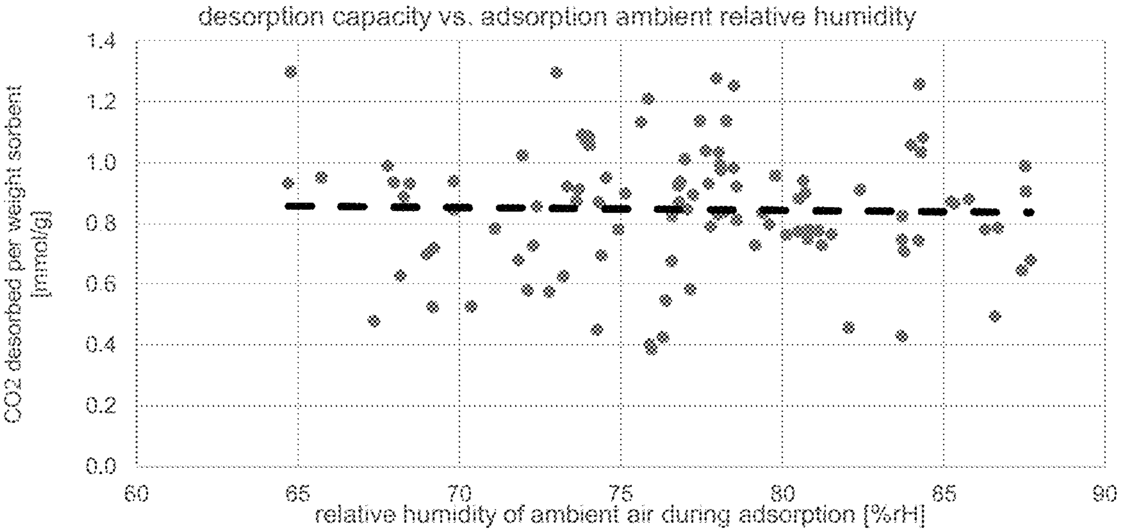
FIG. 13 shows stabilization of performance at average economically feasible values even at high relative humidity of ambient air during adsorption—as measured on a pilot plant with the presented method

FIG. 13 shows the overall CO2-capture performance of the prototype for the successful embodiments described over a multitude of cycles and ambient relative humidity during adsorption. In contrast to FIG. 6, the overall CO2-capacity was retained at an average value above 0.8 mmol/g even at high relative humidity, rather than dropping to values around 0.4 mmol/g as in FIG. 6.

Process and Device Including Heat Recovery:

The proposed process requires substantial amounts of steam, both for the heat-up phase as well as for the purge phase with the instantaneous steam to CO2 ratio during purge from 4:1 to 40:1. The heat of vaporization of water means this steam is generated at a high energetic and therefore financial cost. Economically feasible operation of this process therefore entails the re-use and recovery of the energy input into the steam. The novelty of this process is also given by the following analysis, as to when each of the variants is feasible.

Figure 15:
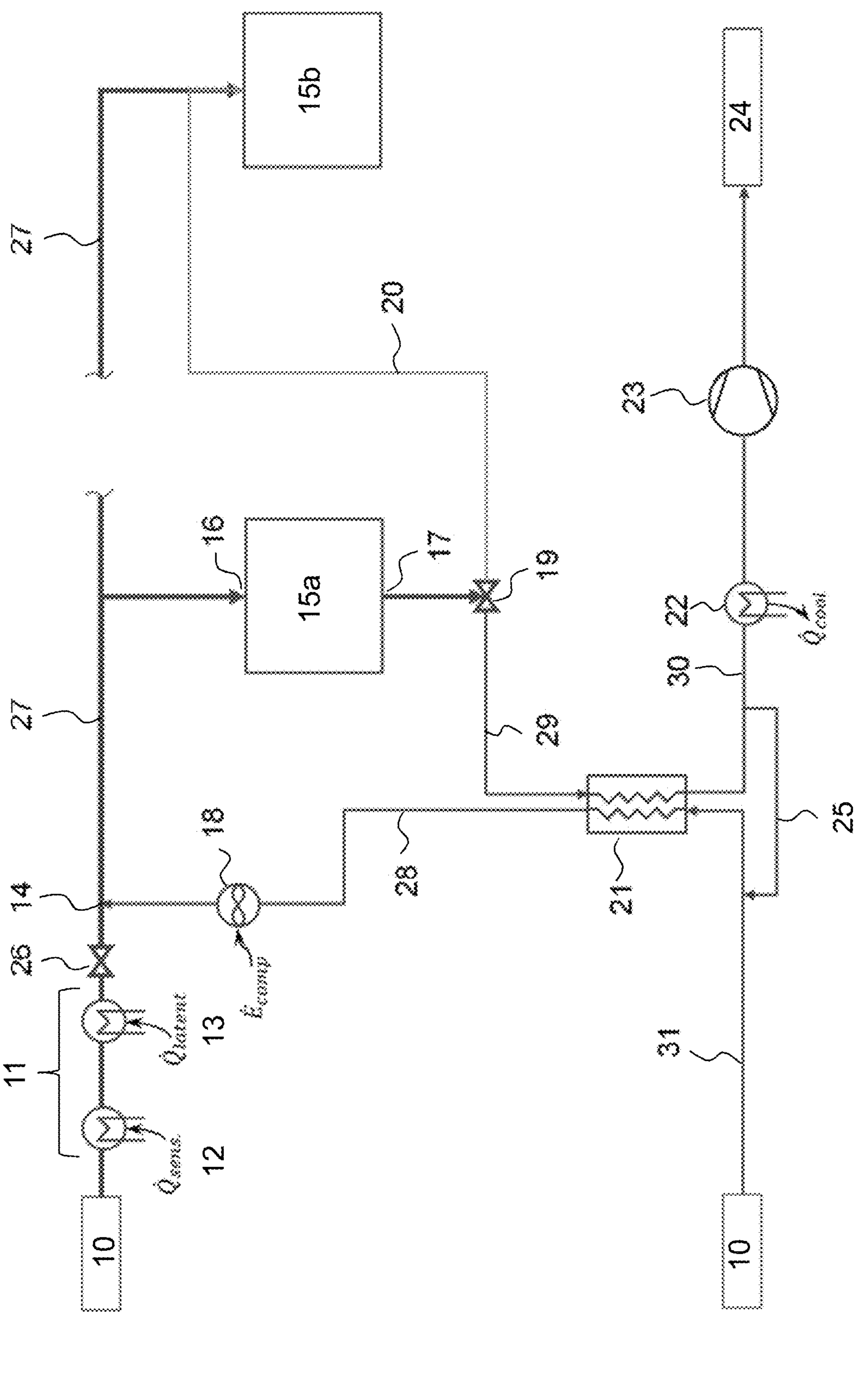
FIG. 15 shows a schematic arrangement of adsorber structures and peripheral equipment for the proposed process and in particular also for employment of energy optimization by the combined recovery of latent heat and for the direct re-use of desorption purge gas flows for desorption heat-up of the next reactor in line to be desorbed.

FIG. 15 schematically illustrates the setup used here. The setup comprises multiple main units (15), each consisting of multiple adsorber structure subunits, which are operated sequentially, with all but one subunit in adsorption, while an individual subunit is in desorption. The same is valid for the next main unit, but at a slight temporal offset, such that one subunit of the initial main unit is in purge mode, and the one subunit of the next main unit is in heat-up mode. In the illustration, 15*a* illustrates an adsorber in purge mode, and 15*b* an adsorber in heat up mode.

Steam can be supplied to the adsorber by way of a liquid water source, the output of which is converted to steam in a fresh steam generation unit 11. The fresh steam generation unit 11 comprises a sensible heat exchanger 12 as well as a latent heat exchanger 13, the elements can also be combined in one heat exchanger. The steam is transported to the adsorber structures 15 by way of steam injection lines 27, entering the corresponding adsorber structure by way of the inlets 16.

Downstream of the adsorber structures 15 and connected to the outlet 17 thereof there are steam outlet lines 29 for taking out the steam/carbon dioxide mixture. By way of a switch valve 19, this exiting steam can either be directed to the process of recovery of carbon dioxide, but it can also be recirculated either to the same adsorber structure (not illustrated), or it can be recirculated to another adsorber structure which is in heat up mode as illustrated by steam reuse line 20. In this steam reuse line, heating elements and propulsion elements can be provided to make sure that at the inlet of the corresponding adsorber structure the recirculated steam has the proper temperature and/or pressure adapted to the process control. For the recirculation aspect a more elaborate description is given in the context of FIG. 16-19 further below.

For the purge outlet steam and carbon dioxide not recirculated and directed by switching valve 19 to the actual take out there is first provided a latent heat recovery unit 21. In this latent heat recovery unit 21 in a crossflow liquid water provided by unit 10 (which can be the same as the above-mentioned one) is heated and converted to steam. The corresponding steam is further compressed in compressor 18, and the resulting steam of adapted pressure and/or temperature is introduced by way of the mixing valve 14 with the fresh steam.

The take-out stream exiting the latent heat recovery unit 21 is then passed by a low temperature condenser 22, passes the main vacuum system 23 to lead to the product carbon dioxide 24.

As an option it is possible to redirect at least a fraction of the take-out stream exiting the latent heat recovery unit 21 for potential condensate reuse as illustrated by line 25.

A low-temperature condenser 22 is thus generally employed before the vacuum pump 23 in order to attain high purity CO2 and lower volume flows requiring less energy to be pumped. Energy efficient recovery of the energy in the purge gas flow is obtained with an upstream heat exchanger 21 operating at higher temperature. The outlet purge gas 29 condenses at high pressure on the hotter side of the heat exchanger 21, while a flow 31 of water vaporizes at a lower pressure on the colder side to produce a fresh flow of steam 28 at this lower pressure. The different pressure levels result in different condensation temperatures on either side of the heat exchanger 21, allowing heat to be transferred across the temperature difference. This newly-evaporated flow 28 of steam is compressed in unit 18 to the required pressure and mixed at 14 with fresh steam to provide the steam 27 for the desorption of the same or next reactor 15.

The required temperature gradient, pressure difference and energy needed for compression limits the flow of steam that can be generated in this fashion as well as the range of operating conditions under which this provides a net benefit. The viability of this concept is given if substantial amounts of steam can be generated in this manner per unit CO2 attained, which is generally the case for high desorption steam to CO2 purge ratios.

The direct re-use of purge gas is an efficient manner to work around the losses and costs associated with the latent heat recovery concept. The desorption purge gas consisting of steam and CO2 is fed directly into the next reaction chamber as it enters the desorption phase. The purge gas outlet flow from the initial reactor then accounts for all or a portion of the steam required for heat-up of the next reactor, and none or a portion of the steam required for purge, depending on the amount of steam for and the duration of the heat-up and purge phases respectively. An "indefinite" number of reactors can be connected in series in this way. This concept is however normally only viable, if the CO2 content of the purge gas flow is sufficiently far from equilibrium conditions to induce additional release of CO2. If this were not the case, the required duration or amount of purge with fresh steam in the second reactor would simply have to be increased to remove the additional CO2 introduced by the steam re-usage, thus essentially negating any benefit from the steam re-usage.

Figure 14:
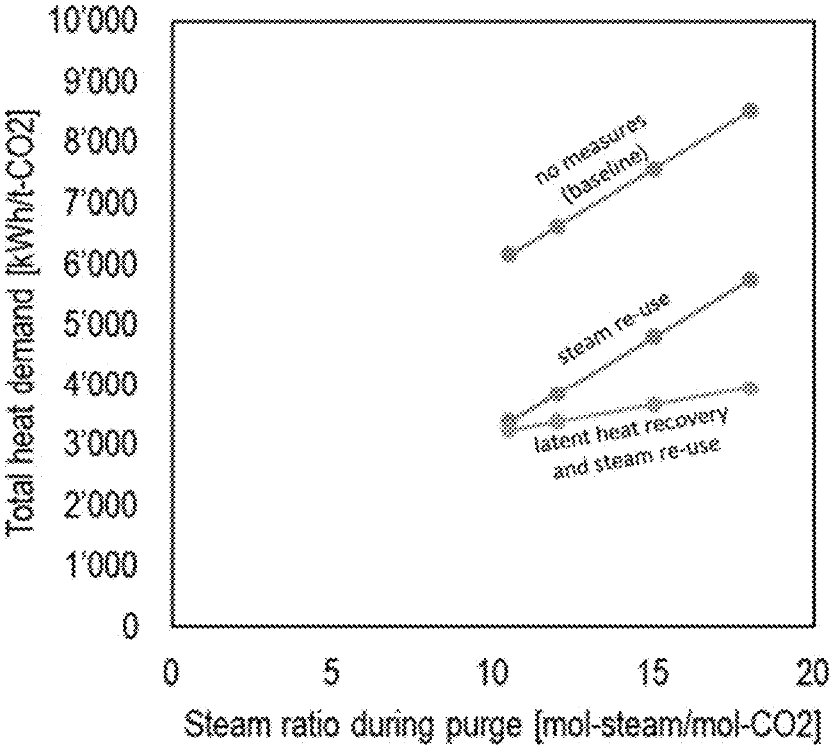
FIG. 14 shows an analysis of the energetic considerations when choosing between using an individual or both heat recovery methods; further costs are not included in this assessment.

Both concepts, direct re-use and latent heat recovery, are employable if overall optimization of energy usage is wanted, and this variant is shown in FIG. 14. However, considering the equipment and investment costs associated with these re-use and recovery concepts, there are certain operating regions where one or the other may be more appropriate.

Here one must distinguish between whether both steam re-use and latent heat recovery are installed on a plant, or, assuming both variants are installed, when each is to be used. This can be discussed as a function of the overall average steam purge ratio, and is shown in FIG. 13. In general, steam re-use is favorable, but at some stage CO2-product is to be extracted, and it is here where latent heat recovery is selectable. If the overall average steam purge ratio is low, steam re-use will be used for the instantaneous higher purge ratio, while the purge ratio will be too low during product extraction to warrant installation of latent heat recovery, which is shown in FIG. 13. If the overall average purge ratio is high and instantaneous purge ratio covers a large range, then the highest purge ratios go towards direct steam re-use, while the lower steam ratios are still adequate to employ latent heat recovery.

Process and Device Including High Speed Steam Purge:

Another implementation of the introduction of steam sees the reactor designed in such a way that the steam passes the adsorber structure at particularly high speed, which can be implemented in that the steam does not take the path of air during adsorption, but rather a path showing increased flow speeds and favorable purge behavior. The design of the adsorber structure minimizes local adsorption air through-flow velocity in order to attain reasonable pressure drops across the adsorber and high through-flows, to maximize CO2 uptake for a given total adsorption flow. However, such low velocities are detrimental to an efficient purge during desorption. Therefore, the flow conditions and/or the adsorber structure as such or rather the flow path through the adsorber structure can be designed in such a way, that the closed and isolated reactor forces the steam through the reactor bed in a path with substantially lower through-flow area and correspondingly higher velocities inducing beneficial purge conditions. While under conventional conditions the flow velocity of the steam is in the range of 0.01 m/s, this high-speed steam purge is carried out at steam velocities in the range of 0.1-0.4 m/s, preferably in the range of 0.2-0.35 m/s. Typically and preferably this high-speed is achieved at the same volume flow as in the conventional process.

The following are a series of examples in which the herein disclosed circulation loop was realized and analyzed for a steam desorption process of DAC sorbent materials, preferably (but not necessarily) for the specific process as described above and as claimed for the embodiment using direct steam recirculation for one unit.

Figure 16:
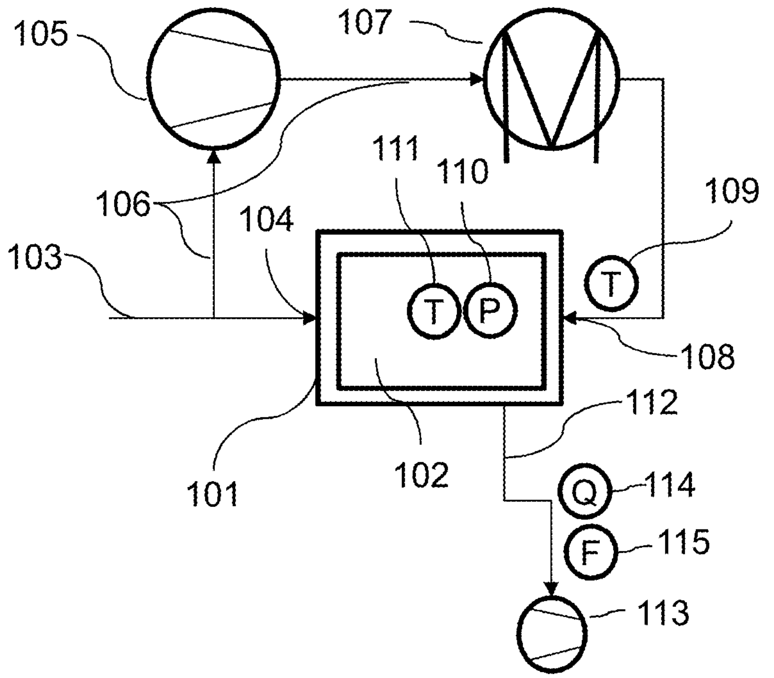
FIG. 16 shows a possible configuration for recirculation of a steam with re-injection into the sorbent regeneration process for the embodiment using direct steam recirculation for one unit.

FIG. 16 shows a possible configuration of a circulation loop connected to a DAC unit 101 containing a sorbent material structure 102 for capturing and releasing CO2 in a cyclic process, undergoing regeneration, i.e. for release of the CO2 bound in the capture phase for collection and for preparation of the next capture phase.

Fresh steam 103 can be supplied and enters the DAC unit 101 at the connection 104 or is aspirated by a circulation device 105 into a circulation conduit 106, passing further to a heat exchanger 107 before (re) entering the DAC unit at the inlet 108.

As the purpose of the circulation is to achieve far higher effective purge ratios than would otherwise be possible with single pass operation, the volume flow of steam in the circulation loop is much higher than that of the fresh steam injection 103. A rather small flow of fresh steam 103 is aspirated into the circulation loop 106 without passing first into the DAC unit 101. The remainder of the flow difference is given by steam in mixture with desorbed CO2 aspirated out of the DAC unit at connection 104 and passed into the circulation conduit 106.

For realizing the process control in order to avoid drying and to optimize desorption, there is a temperature sensor 109 for sensing the temperature of the exiting gases at the connection 108 to the DAC unit, there is a sensor 111 for the sorbent temperature T-11 in the DAC unit and a sensor 110 for the pressure P-10 in the DAC unit.

Based on these parameters the heat input (e.g. heating temperature) of heat exchanger 107 as well as the extraction of gas from the DAC unit 101 through the conduit 112 by a vacuum extraction device 113 can be adapted to reach the desired steam conditions ideal for desorption while avoiding or limiting drying. The gas composition Q-14 and flow rate F-15 of the extracted gases are measured at the composition and flow sensors 114 and 115, respectively, which support hereby the heating and pressure control of the heat exchanger 107, vacuum system 113 and circulation device 105.

For the capture of CO2 from atmospheric air, first a gas flow of said air is contacted with the sorbent material structure contained in the unit where said gas flow can have ambient atmospheric conditions. Upon the saturation of the sorbent-typical duration between 60 and 180 min, the unit is isolated from the gas flow and evacuated for example to a nominal pressure of 100 mbarabs.

A saturated steam flow of 1000 kg/h is then applied to the evacuated and isolated unit where in this example additionally the circulation loop is operational (see more details below).

Hereby the temperature is allowed to rise to 90 °C and the pressure to 850 mbarabs. The unit is then again attached to the vacuum system whereby the released CO2 and the applied steam are extracted while the circulation loop is continuing the herein described circulating steam flow. In this example, a fresh steam flow of 200 kg/h is applied to the unit. Upon completion of release of CO2, the fresh steam flow and the circulation loop are stopped and the pressure of the unit is rapidly reduced by the vacuum system to 120 mbarabs provoking a re-evaporation of liquid water from the sorbent material and thereby a cooling to ca. 50 °C The unit is thereafter repressurized to atmospheric conditions and opened to the flow of ambient atmospheric air to restart the adsorption.

Figure 17:
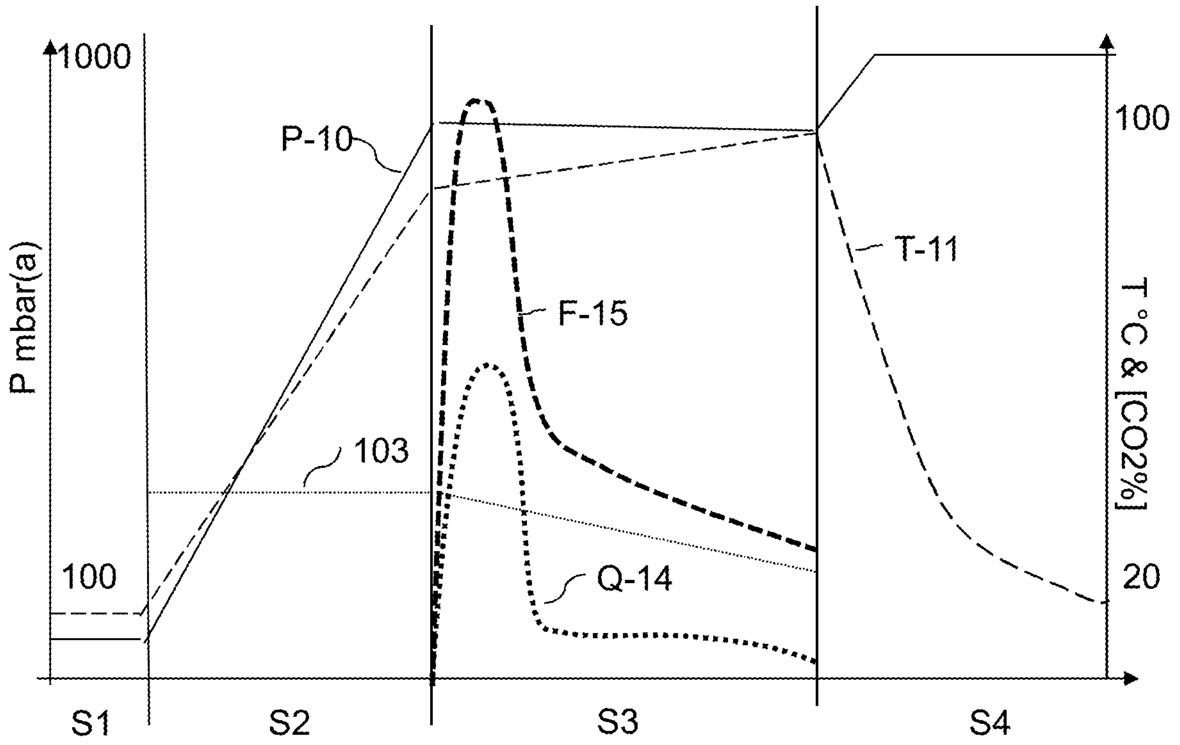
FIG. 17 shows experimental process curves for temperature, pressures and flows for a steam circulation desorption of a typical DAC sorbent for the embodiment using direct steam recirculation for one unit.

FIG. 17 shows experimental results of the operation of the device in FIG. 16 operating a ‘continuous fill/continuous pass’ sorbent regeneration procedure, wherein the phase S1 pressure P-10 measured by the sensor 110 in the DAC unit 101 is ca. 100 mbarabs (thin solid line) and the sorbent temperature T-11 is at a nominal ambient environmental temperature of 20 °C (thin dashed line).

In phase S2, fresh steam 103 is injected into the DAC device at a constant flow rate with an operating circulation loop having a heating power at 100 °C of 2 KW and a circulation flow rate of 780 $m^3$/h. No gas is extracted in phase S2, and under the influence of steam condensation and sensible heat exchange with superheated steam the temperature T-11 of the sorbent in the DAC unit and the pressure P-10 in the DAC unit material rise to a nominal value of ca. 85 °C and 900 mbarabs respectively, which is well within the range of desorption for a typical amine functionalized solid sorbent. The difference to the saturation pressure of steam at 900 mbarabs stems from both a small portion of air in the system, which reduces the effective partial pressure as well as the presence of desorbed CO2.

In phase S3, the extraction of gases is started by the vacuum compression device 113 and the flow profile F-15 of extracted gases (thick dashed line) is measured by the flow sensor 115 with the fraction of CO2 Q-14 being measured by the composition Q sensor 114 (thick dotted line). In this experiment, the flow of fresh steam is gradually reduced in phase S3 from an initial value of 20 kg/h to 5 kg/h and is correspondingly far lower than the volume flow rate of steam in the circulation loop. At first, in Q-14 a peak of released CO2 is found which stems from the CO2 released in the heating phase of S2. Thereafter a more or less constant to decreasing flow of 1-0.5 kg/h is recorded. The temperature T-11 of the sorbent material rises constantly in S3 to about 100 °C owing to the exchange of sensible energy with the superheated steam and desorbed CO2 existing in the circulation gas.

Simultaneously, the pressure stays substantially constant. This combination of pressure and temperature lies well within the range of superheated steam and therefore drying of the sorbent can be assumed to have taken place.

This is supported by the fact that the pressure P-10 in the DAC unit 101 remains constant despite a reducing fresh steam supply and a reducing flow rate F-15 as measured by the flow meter 115 and the composition sensor Q-14, respectively. The release of water from the sorbent therefore is responsible for maintaining the pressure P-10.

The flow F-15 of the product gas mirrors the peak in CO2 and tends to match the supply of fresh steam flow 103 with a small additional portion owing to water stemming from drying.

The total ratio of steam supplied to the released CO2 in this experiment was 18:1 whereas the composition of steam to CO2 lay between 2:1 (50%) and 32:1 (3.2%) at the beginning and end of phase S3, respectively.

In the next phase S4, the system is re-pressurized and the sorbent is allowed to cool off bringing it to a state ready for the next adsorption of CO2.

Important in these results is the interplay of pressure, temperature of circulating gases consisting of steam and CO2 and flow composition. These three factors influence the drying of sorbent but also the release of CO2 from a particular sorbent as dictated by the isotherms of that material as will be shown by the next figure.

Figure 18:
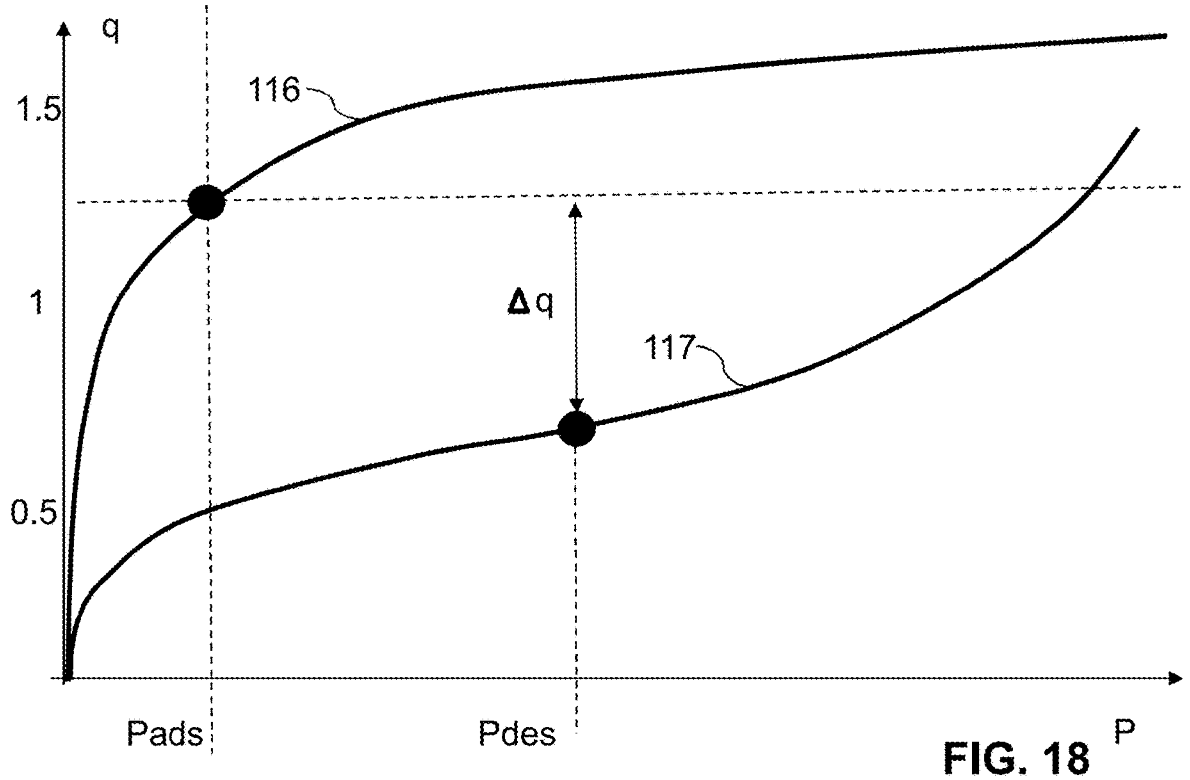
FIG. 18 shows equilibrium isotherms of a typical DAC sorbent at ambient atmospheric and elevated temperatures for the embodiment using direct steam recirculation for one unit.

FIG. 18 illustrates the impact of desorbate accumulation in the circulating steam and the importance of maintaining a minimum steam to CO2 ratio in the circulation loop.

A DAC sorbent is shown with two equilibrium isotherms: at ambient atmospheric conditions 116 characterized by ambient atmospheric temperatures and an adsorbate partial pressure Pads and an elevated temperature isotherm 117 at 100 °C Between these two curves, there exists a maximum partial pressure of desorbate Pdes on the line 117 which can be accepted to give a minimum cyclic adsorption-desorption capacity Δq needed for economically feasible operation. At higher Pdes, the cyclic capacity cannot be reached thermodynamically. It has been experimentally found that for a typical amine functionalized solid sorbent with $CO_2$ adsorption equilibrium capacity of 1.5 mol/kg at ambient atmospheric conditions and a desired cyclic capacity Δq at 100 °C desorption temperature of 1 mol/kg, the maximum allowable CO2 partial pressure Pdes can be at most 8%. Correspondingly, desorbate in mixture with steam must have a steam to CO2 ratio over the entire process of at least 12.5:1.

At lower steam to CO2 ratios and therefore lower energy demand, the desorption equilibrium point shifts right to higher Pdes and lower cyclic capacities Δq. Further, the lower steam ratio drives lower water partial pressures, which strengthens drying processes at the temperatures required for desorption of CO2.

At higher steam to CO2 ratios, higher cyclic capacities Δq can be reached, but more fresh steam must be injected to the process. Although the generation of fresh steam is thermally on a parity with drying of water from the sorbent, drying is in circulation significantly slower as will be shown. While it is tempting from an energy standpoint to conduct the aforementioned “single-fill” desorption variant, this example demonstrates that at least for the indicated sorbent it cannot be economically done and that fresh steam must always be injected.

Example 1—Dimensioning of Process Equipment in Circulation and Estimates of Process Duration This example explains the practical limitations for operation of circulation consisting of superheated steam and CO2 for DAC applications and addresses an interplay between capital costs for gas conduits and operation costs for gas propulsion.

Cost wise, there is a sharp increase in the costs of gas conduits suitable for vacuum applications and isolation valves above a diameter of about 350 mm. Correspondingly, it is necessary to remain below 350 mm piping diameter.

The second limitation involves gas propulsion devices which become increasingly complex, expensive and limited in their volume throughput above 1000 Pa maximum pressure difference. The pressure difference that a gas propulsion device would need to overcome in a circulation loop would be composed of the pressure drop across the sorbent material structure 102, the circulation conduits 106 and heat exchanger 107. Respecting this pressure limit and assuming a sorbent material structure such as that mentioned in the prior art containing 500 kg of sorbent, piping lengths for circulation conduits of 10 m, and a 2 m long heat exchanger having 2 mm plate spacing, a sweep gas volume flow of 14000 Nm3/h is determined. Such flow propulsion devices are firmly in the region of radial blowers.

There are two further practical temperature limitations imposed by the sorbent and process which are not encountered in the prior art. Firstly, amine functionalized solid sorbents typical and suitable in DAC applications are irreversibly damaged above 120 °C, which caps the steam temperature. Secondly, assuming a 12.5:1 (steam to CO2 ratio) and desorption pressure of 900 mbar (a), the temperature of the steam must stay above 94.5 °C to avoid condensation and loss of the steam in the sweep gas altogether. Correspondingly, the useable temperature difference is 25.5 °C and the available thermal energy for desorption under circulation is 104 KW. This thermal energy must be supplied by a corresponding heat exchanger, which on the gas side is assumed to have a heat transfer coefficient of 50 $W/m^2/K$ and a gas side contact surface area of 83.3 m2.

Considering a possible energy demand for the desorption process as can be found in the prior art of 2578 kWh/ton CO2 with a yield of 1 mol CO2/kg and a water release of 3 mol H2O/kg, the process of this example has a thermal energy demand of 56 kWh and a duration therefore of 32 min. The mechanical energy demand for circulation is 2.1 kWh.

Example 2—Implications of Significant Drying on Desorption Processes

In this example, the dimensioning of example 1 is again considered. Certain classes of amine functionalized sorbents tend to capture significantly more water than the 3 mol H2O/kg mentioned. Further, steam processes relying on latent heating by steam condensation such as that shown in FIG. 17 will apply much more liquid water to the sorbent than the temperature vacuum swing process of the prior art considered in Example 1. A more realistic water loading may be 15 mol$H_2O$/kg. Drying this water amount from the sorbent would represent an additional 84 kWh of energy, which would need to be supplied by the circulation loop. Due to the aforementioned power limitations of 104 KW, the time for this drying alone would be 48 min producing a desorption process time of minimum 80 min.

Such processes are in no ways competitive in terms of output or energy demand against processes in which thermal energy is applied through heat exchangers integrated into the sorbent material structure. For this reason, significant drying of the sorbent should be avoided in circulation sweep gas desorption.

Example 3—Kinetic Limitations Associated with Water

Figure 19:
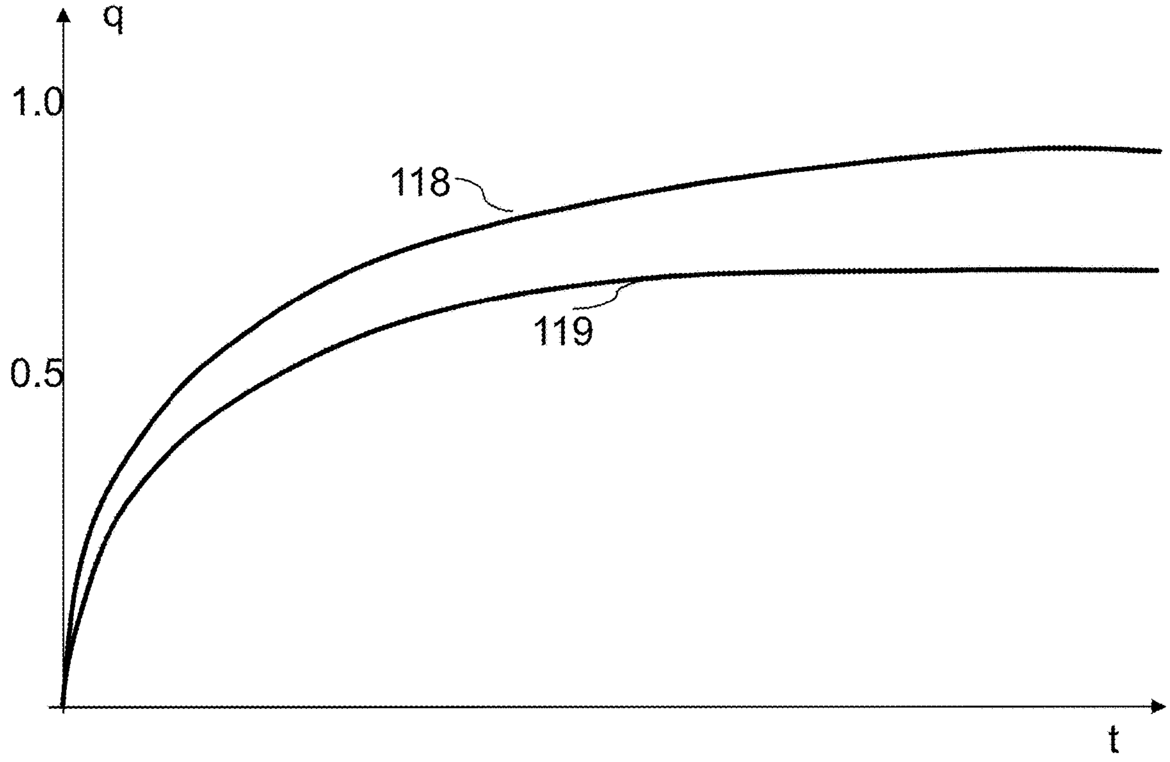
FIG. 19 shows uptake capacities of dry and wet sorbents under typical conditions of atmospheric $CO_2$ adsorption for the embodiment using direct steam recirculation for one unit.

While the previous example showed that significant drying should be avoided, FIG. 19 shows that certain kinetic limitations associated with water introduction in sorbent materials can be thusly overcome with a small amount of drying. Water introduction has been identified in as a major kinetic resistance to adsorption and is particularly a challenge for steam desorption processes utilizing the latent heating of steam condensation with prolonged purge settings. The adsorption kinetics were investigated on the same DAC amine functionalized solid sorbent desorbed in a saturated steam purge and with a superheated circulating sweep gas at 100 °C and 850 mbar (a). As such, the latter sorbent experienced a certain exposure to conditions, which would dry adsorbed or otherwise accumulated water. In the subsequent adsorptions of $CO_2$ from ambient atmospheric air, it was found that the dried sorbent 118 had a faster uptake of $CO_2$ than the sorbent which did not see drying conditions 119 (0.61 vs. 0.48 mol$O_2$/kg in 3 hours). Secondly, the equilibrium capacity of the dried sorbent 18 was higher. Both observations are consistent with previous results, which show that liquid water removal is beneficial to sorbent performance. While the exact amount of water to be dried depends on the sorbent characteristics as well as the process requirements, the circulation loop with superheated steam offers the functionality of tuning the water content to optimize process output and sorbent performance.

Example 4—Process Control to Avoid Steam Loss in Circulation Loop

In this example, the process control for the steam recirculation is explained and how it can be used to optimize the balance of drying and desorption in a regeneration process comprising the first two phases of FIG. 17. At the beginning of stage S3, the steam to $CO_2$ ratio may be 2:1 at a total pressure of 900 mbarabs producing a partial steam pressure of 600 mbarabs with a corresponding saturation temperature of 86 °C which is substantially the same as the sorbent temperature at this moment. The heat exchanger 107 of the recirculation loop is therefore set such that the temperature 109 of the gases at the reinjection point of the unit 108 achieves 96 °C, which affords a good heat transfer temperature difference to the sorbent to support desorption while limiting the drying potential of the circulation gases and avoiding condensation. In the depicted process, the $CO_2$ content as measured gradually decreases under the influence of slowing desorption and the continuously introduced steam. At some point, a value of 15:1 may be reached still at a total pressure of 900 mbarabs, producing a partial steam pressure of 843 mbarabs and a corresponding saturation temperature of 95 °C that is substantially the sorbent temperature at this moment. In such a case, the described process control increases the temperature 109 of the gases at the reinjection point of the unit 108 beyond the previously mentioned 96 °C—for example to 106 °C—in order to avoid undesired condensation of the steam.

Example 5—Process Control to Prevent Excessive Drying

In this example, the disclosed process control for the steam recirculation is used to avoid excessive drying of the sorbent. Again, the first two stages of the process of FIG. 17 (S1 and S2) are common. However, for a particular sorbent, no $CO_2$ is present in the gas phase of the until the beginning of S3. Therefore, at 900 mbarabs, the temperature of the sorbent is substantially equal to the saturation temperature of the steam (96 °C). At the beginning of circulation, the temperature 109 of the gases at the reinjection point of the unit 108 can be set at for example 120 °C to drive strong heat transfer to the sorbent material for the start of desorption. In one possible process variant, the injection of fresh steam is not used and once the circulation of stage S3 is started, $CO_2$ is gradually released and accumulates in the circulation gases reaching 20% in the circulation gases or a steam to $CO_2$ ratio of ca. 4:1. The corresponding partial pressure of steam in the circulation gases is therefore 720 mbarabs with a saturation temperature of 90.7 °C, which corresponds substantially to the sorbent temperature. The herein disclosed process control hereby reduces the temperature 109 of the gases at the reinjection point of the unit 8 from 120 °C to 100 °C thereby maintaining a sufficient temperature difference for driving desorption while not excessively drying the sorbent materials.

LIST OF REFERENCE SIGNS

1 adsorption step (a)
2 isolation step (b)
3 evacuation step (b)
4 step involving flushing with steam (b1)
5 step involving heat up with steam (c)
6 purge step with steam (d)
7 vacuum cool/dry step (d1)
8 step of breaking isolation and up re-pressurisation (e)
9 step of air drying (e1)
10 liquid water source
11 fresh steam generation unit
12 sensible heat exchanger of 11
13 latent heat exchanger of 11
14 mixing of fresh with recirculated/preheated steam
15 adsorber structure
15*a* adsorber structure N in purge
15*b* adsorber structure N in heat-up
16 inlet of 15
17 outlet of 15
18 compressor for recirculated/preheated steam
19 switching valve
20 steam reuse line
21 latent heat recovery unit
22 low temperature condenser
23 main vacuum system
24 product $CO_2$
25 optional condensate reuse
26 valve
27 steam injection line
28 fresh/recovered steam line
29 steam outlet line 119

30 take out line
31 fresh water line F-15
101 DAC Unit Q-14 $CO_2$ fraction in flow
102 sorbent material structure measured in 114
103 fresh steam S1-S4 phases of a process involving
104 connection for extraction of circulation gas on DAC unit
105 propulsion device
106 circulation conduit
107 heat exchanger
108 re-injection point of sweep gas into DAC unit
109 injection point temperature sensor
110 DAC unit pressure measurement sensor
111 sorbent material temperature measurement sensor
112 product gas extraction conduit
113 vacuum compression device
114 composition sensor
115 flow measurement sensor
116 adsorption condition equilibrium isotherm
116 desorption condition equilibrium isotherm
117 desorption condition equilibrium isotherm
118 adsorption capacity curve of dried sorbent
119 adsorption capacity curve of wetted sorbent
F-15 flow measured in 115
Q-14 $CO_2$ fraction in flow measured in 114
S1-S4 phases of a process involving circulation
T-11 sorbent material temperature value measured in 111
T temperature measurement
P pressure measurement
P-10 DAC unit pressure measured in 110
Q composition measurement
F flow measurement
q adsorption capacity
Δq cyclic capacity
t time

The invention claimed is:

1. A method for separating gaseous carbon dioxide from a gas mixture, said gas mixture containing said gaseous carbon dioxide as well as further gases different from gaseous carbon dioxide, by cyclic adsorption/desorption using a sorbent material adsorbing said gaseous carbon dioxide, using a unit containing an adsorber structure with said sorbent material, said unit being evacuable to a vacuum pressure of 400 mbarabs or less, and said adsorber structure being heatable to a temperature of at least 60 °C for desorption of at least said gaseous carbon dioxide and said unit being openable to flow-through of said gas mixture and for contacting said gas mixture with said sorbent material for an adsorption step, wherein said method comprises at least the following sequential and in this sequence repeating steps (a)-(d):

(a) contacting said gas mixture with said sorbent material to allow at least said gaseous carbon dioxide to adsorb on said sorbent material under ambient atmospheric pressure and ambient atmospheric temperature in said adsorption step;

(b) isolating said sorbent material with adsorbed carbon dioxide in said unit from said flow-through while maintaining the temperature in the sorbent material and then evacuating said unit to a pressure in the range of 20-400 mbarabs;

(c) injecting a stream of saturated or superheated steam and thereby inducing an increase in internal pressure of said unit and an increase of the temperature of the sorbent material to a temperature between 60 and 110 °C, starting desorption of $CO_2$;

(d) extracting at least desorbed gaseous carbon dioxide and steam from said unit and separating gaseous carbon dioxide from steam by condensation in and downstream of said unit;

(e) bringing the sorbent material to ambient atmospheric pressure and ambient atmospheric temperature.

2. The method according to claim 1, wherein after step (d) and before step (e) the following step is carried out:

(d1) ceasing the injection and, if used, a partial recirculation of steam, and evacuating said unit to pressure values between 20-500 mbarabs, thereby causing evaporation of water from said sorbent material and both drying and cooling the sorbent material.

3. The method according to claim 1, wherein in step (b) said unit is evacuated to a pressure in the range of 20-400 mbarabs, or 100-200 mbarabs, while not heating the sorbent material, and/or wherein the following step is carried out:

(b1) flushing the unit of non-condensable gases by a stream of non-condensing steam while essentially holding the pressure at the end of step (b).

4. The method according to claim 1, wherein step (e) of bringing the sorbent material to ambient atmospheric pressure and ambient atmospheric temperature is implemented by ambient atmospheric air entering the unit.

5. The method according to claim 1, wherein in step (c), steam is injected in the form of fresh steam introduced by way of a corresponding inlet of said unit, and steam is partially recirculated from an outlet of said unit or from an outlet of another unit to said inlet.

6. The method according to claim 1, wherein in step (c) the sorbent material is heated to a temperature in the range of 80-110 °C.

7. The method according to claim 1, wherein in at least one of step (c) and step (d) the flow velocity of the steam in the adsorber structure is above 0.05 m/s.

8. The method according to claim 1, wherein in step (d) the molar ratio of steam to carbon dioxide is in the range of 4:1-40:1, and/or wherein in step (c) steam, either saturated at the current pressure or superheated to between 80 °C to 120 °C, is introduced to the sorbent material at a ratio of 1 kg/h to 10 kg/h of steam per kg of sorbent material in a given flow direction, until the pressure lies between 600 mbar and 950 mbar, such that the sorbent material temperature reaches values between 85 °C and 110 °C, by adsorption and/or condensation of said steam on the sorbent material.

9. The method according to claim 1, wherein in at least one of step (c) and step (d) steam is injected into the unit to flow-through and contact the sorbent material under saturated steam or superheated steam conditions with a superheated steam temperature of up to 140 °C, and wherein at least part of the steam having passed through the unit and carrying at least part of the carbon dioxide desorbed from the sorbent material is recirculated back into the unit for at least a second flow-through and contact with the sorbent material.

10. The method according to claim 9, wherein steam having passed through the unit and recirculated back into the unit is subjected to a step of reheating, and/or wherein steam having passed through the unit and recirculated back into the unit is subjected to a step of reheating at a heating power at 100 °C of at least 0.05 kW/kg sorbent material, and/or wherein steam having passed through the unit and recirculated back into the unit is subjected to a step of active propulsion, and/or wherein during recirculation the mass ratio of steam to carbon dioxide in a recirculation loop is at least 3:1 or at least 5:1-, and/or wherein the saturation temperature of the steam in the recirculated steam is less than 40 °C higher than the sorbent material temperature in the unit at a pressure of regeneration of the sorbent material.

11. The method according to claim 1, wherein step (d) comprises at least one phase S2, in which fresh steam is introduced into the unit and at the same time steam is recirculated without extraction of gas from the unit, and at least one phase S3 involving extraction of gas from the unit under continued recirculation of steam, and/or wherein at least one of step (c) and step (d) is controlled based on at least one of the following parameters: temperature of recirculated steam at an outlet and/or an inlet of the adsorber structure, pressure of the recirculated steam at the outlet or the inlet of the adsorber structure, composition of the recirculated steam at the outlet and/or the inlet of the adsorber structure, temperature of the sorbent material or a combination thereof.

12. The method according to claim 1, wherein in step (c) a unit outlet is opened such that a fraction between 0.1-10% of the injected steam is used to flush the unit by leaving through the unit outlet thus purging the reactor of remaining ambient air while the sorbent material temperature is increasing, and/or wherein in step (a) adsorption of CO2 from said gas mixture occurs by forced convection of said gas mixture at flow rates of ambient air in a range of 20 $m^3/h$ to 200 $m^3/h$ per kg of sorbent material.

13. The method according to claim 1, wherein step (d) involves extracting at least desorbed gaseous carbon dioxide from said unit and separating gaseous carbon dioxide from steam by condensation in and downstream of said unit, while still contacting the sorbent material with steam by injecting and/or recirculating saturated or superheated steam into said unit, thereby flushing and purging both steam and CO2 from the unit at a molar ratio of steam to carbon dioxide between 4:1 and 40:1, while regulating the extraction and/or steam supply to essentially maintain the pressure and/or temperature in the sorbent material at the end of the preceding step (c) and/or to essentially maintain the pressure in the sorbent material at the end of the preceding step (c).

14. The method according to claim 1, wherein after step (d) and before step (e) the following step is carried out:

(d1) ceasing the injection and, if used, a partial recirculation of steam, and evacuating the unit to pressure values in the range of 50-250 mbarabs in the unit, thereby causing evaporation of water from the sorbent material and both drying and cooling the sorbent material.

15. The method according to claim 1, wherein after step (b) and before step (c) the following step is carried out:

(b1) flushing the unit of non-condensable gases by a stream of non-condensing steam while essentially holding the pressure at the end of step (b), holding the pressure at the end of step (b) in a window of ±50 mbarabs of the pressure at the end of step (b) and/or holding the temperature below 70 °C or below 60 °C.

16. The method according to claim 15, wherein in step (b1) the unit is flushed with saturated steam or steam superheated by at most 20 °C in a ratio of 1 kg/h to 10 kg/h of steam per kg of sorbent material, while remaining at the pressure at the end of step (b), to purge the unit of ambient air.

17. The method according to claim 1, wherein step (e) is implemented by allowing ambient atmospheric air into the unit.

18. The method according to claim 17, wherein in step (e) said stream of warm air is at ambient pressure and 10 m3/h to 100 m3/h per kg of sorbent material, and at a temperature between 40 °C and 90 °C, until the sorbent material water content lies below 15-30 weight %.

19. The method according to claim 1, wherein in step (c), steam is injected in the form of fresh steam introduced by way of a corresponding inlet of said unit, and steam is partially recirculated from an outlet of said unit or from an outlet of another unit to said inlet, involving reheating and/or propulsion of recirculated steam.

20. The method according to claim 1, wherein in step (c) the sorbent material is heated to a temperature in the range of 85-98 °C.

21. The method according to claim 1, wherein in step (c) the pressure in the unit is in the range of 750-850 mbarabs.

22. The method according to claim 1, wherein at least a portion of the desorbed gaseous carbon dioxide and steam flow exiting the adsorber structure in step (d) passes through a heat exchanger in which at least a part of the steam contained in said desorbed gaseous carbon dioxide and steam purge gas flow for the condensation at the hot side of the heat exchanger, before a remaining portion of the desorbed gaseous carbon dioxide and steam flow continues to a vacuum pump and a CO2 production outlet, while on a cold side of said heat exchanger a flow of water is vaporized, at lower pressure and condensation temperature than that of the desorbed gaseous carbon dioxide and steam flow, and is compressed and added to a flow of freshly generated steam used for a portion or the entire duration of the same or a next adsorber structure's desorption heat-up phase step (c) and/or a portion of said adsorber structure's step (d), and/or wherein at least a portion of a desorbed gaseous carbon dioxide and steam flow exiting the adsorber structure in step (d) is sent directly to a next adsorber structure that has already been evacuated for a portion or the entire duration of said next adsorber structure's step (c) and for a portion of said adsorber structure's step (d), wherein only one of either the direct re-use of desorbed gaseous carbon dioxide and steam flow in another or the same adsorber structure or alternatively the recovery of latent heat in an external heat exchanger is implemented and the entire desorbed gaseous carbon dioxide and steam flow is sent only to the respective device.

23. The method according to claim 1, wherein in step (c) and/or in step (d) the flow velocity of the steam in the adsorber structure is in the range of 0.2-0.35 m/s, wherein a flow velocity of the steam in the adsorber structure is achieved in that the steam takes a different path to a flow of the gas mixture during adsorption in step (a) in order to increase local steam velocity in the adsorber structure during desorption.

24. The method according to claim 23, wherein the overall flow paths of adsorption in step (a) and during steam injection in step (c) and/or (d) are essentially orthogonal.

25. The method according to claim 1, wherein in step (d) the molar ratio of steam to carbon dioxide is in the range of 10:1-30:1, and wherein the extraction and/or steam supply is regulated to maintain the temperature in the sorbent material in a window of ±10 °C, or in the window of ±5 °C from the temperature at the end of the preceding step, and/or wherein in step (c) steam, either saturated or superheated to between 95 °C and 110 °C, is introduced to the sorbent material at a ratio of 1 kg/h to 10 kg/h of steam per kg of sorbent material in a given flow direction, until the prevalent pressure lies between 800 mbar and 950 mbar, such that the sorbent material temperature reaches values between 90 °C and 105 °C by adsorption and/or condensation of said steam on the sorbent material.

26. The method according to claim 1, wherein in at least one of step (c) and step (d) steam is injected into the unit to flow-through and contact the sorbent material under saturated steam or superheated steam conditions with a superheated steam temperature of up to 140 °C, and wherein at least part of the steam having passed through the unit and carrying at least part of the carbon dioxide desorbed from the sorbent material is recirculated back into the unit for at least a second flow-through and contact with the sorbent material, wherein at least one of step (c) and step (d) comprises at least one phase, in which there is recirculation of the steam, and/or wherein the recirculation volume flow is in the range of 20-80 $m^3$/h/kg sorbent material, wherein the recirculation volume flow is in the range of more than 10,000 $m^3$/h.

27. The method according to claim 9, wherein steam having passed through the unit and recirculated back into the unit is subjected to a step of reheating, to a temperature above 95 °C, or to a temperature above 100 °C, and/or wherein steam having passed through the unit and recirculated back into the unit is subjected to a step of reheating at a heating power at 100 °C of at least 0.2 kW/kg sorbent material, and/or wherein during recirculation the mass ratio of steam to carbon dioxide in a recirculation loop is in the range of 10:1-15:1, and/or wherein the saturation temperature of the steam in the recirculated steam is less than 20 °C higher than the sorbent material temperature in the unit at the pressure of regeneration of the sorbent material, wherein a pressure of regeneration of the sorbent material is in the range of 100 and 1500 mbar (a), or between 600 and 1200 mbar (a).

28. The method according to claim 9, wherein step (d) comprises at least one phase S2, in which fresh steam is introduced into the unit and at the same time steam is recirculated, followed by at least one phase S3 involving extraction of desorbed gaseous carbon dioxide and steam from the unit under continued recirculation of steam and under decreasing supply with fresh steam, and/or wherein at least one of step (c) and step (d) is controlled based on at least one of the following parameters: temperature of the recirculated steam at the outlet and/or the inlet of the adsorber structure, pressure of the recirculated steam at the outlet or the inlet of the adsorber structure, composition of the recirculated steam at the outlet and/or the inlet of the adsorber structure, temperature of the sorbent material or a combination thereof, and wherein further the composition of the recirculated steam is used as a parameter for determining how much fresh steam is introduced, and/or at which moment extraction of gas from the unit is started, and/or to which extent extraction of gas from the unit is taking place in combination with recirculation and/or injection of steam.

29. The method according to claim 28, wherein the temperature and/or the pressure of the recirculated steam at the inlet of the adsorber structure is controlled, based on at least one of the temperature of the recirculated steam at the outlet of the adsorber structure, the composition and/or pressure of the recirculated steam at the outlet of the adsorber structure, and the temperature of the of the sorbent material, to avoid drying of the sorbent material in the adsorber structure.

30. The method according to claim 29, wherein the temperature and/or the pressure of the recirculated steam at the inlet of the adsorber structure is controlled such that the saturation temperature of the steam in the adsorber structure is at least as high as or higher than the temperature of the of the sorbent material in the adsorber structure.

31. The method according to claim 30, wherein the saturation temperature of the steam in the adsorber structure is at least as high as or higher than the temperature of the of the sorbent material in the adsorber structure, namely at least 5 °C or at least 10 °C, higher than the temperature of the of the sorbent material in the adsorber structure and/or at most 20 °C or at most 15 °C higher than the temperature of the sorbent material in the adsorber structure for avoiding drying of the sorbent material.

32. The method according to claim 1, wherein step (e) of bringing the sorbent material to ambient atmospheric pressure and ambient atmospheric temperature is implemented by drying of the sorbent material with a stream of warm air.

33. The method according to claim 1, wherein step (e) is implemented by drying of the sorbent material with a stream of warm air having a temperature in the range of 40-100 °C.

34. A device for carrying out the method according to claim 1, comprising:

the unit containing the adsorber structure with said sorbent material, the unit being evacuable to a vacuum pressure of 400 mbarabs or less, and the adsorber structure being heatable to a temperature of at least 80 °C for the desorption, comprising means for injecting steam into the unit to flow-through and contact the sorbent material under saturated steam or superheated steam conditions with a superheated steam temperature of up to 140 °C at the pressure level in said unit, the unit being openable to flow-through of the gas mixture across and/or through said sorbent material and for contacting it with the sorbent material for the adsorption step, and comprising no further internal or external heating means for heating the sorbent material.

35. A method for separating gaseous carbon dioxide from a gas mixture, said gas mixture containing said gaseous carbon dioxide as well as further gases different from gaseous carbon dioxide, by cyclic adsorption/desorption using a sorbent material adsorbing said gaseous carbon dioxide, using a unit containing an adsorber structure with said sorbent material, said unit being evacuable to a vacuum pressure of 400 mbarabs or less, and said adsorber structure being heatable to a temperature of at least 60 °C for desorption of at least said gaseous carbon dioxide and said unit being openable to flow-through of said gas mixture and for contacting said gas mixture with said sorbent material for an adsorption step, wherein said method comprises at least the following sequential and in this sequence repeating steps (a)-(d):

(a) contacting said gas mixture with said sorbent material to allow at least said gaseous carbon dioxide to adsorb on said sorbent material under ambient atmospheric pressure and ambient atmospheric temperature in said adsorption step;

(b) isolating said sorbent material with adsorbed carbon dioxide in said unit from said flow-through while maintaining the temperature in the sorbent material and then evacuating said unit to a pressure in the range of 20-400 mbarabs;

(c) injecting a stream of saturated or superheated steam and thereby inducing an increase in internal pressure of said unit and an increase of the temperature of the sorbent material to a temperature between 60 and 110 °C, starting desorption of CO2;

(d) extracting at least desorbed gaseous carbon dioxide and steam from said unit and separating gaseous carbon dioxide from steam by condensation in or downstream of said unit;

(e) bringing the sorbent material to ambient atmospheric pressure and ambient atmospheric temperature, and wherein in step (c) the pressure in the unit is in the range of 700-950 mbarabs.

36. A method for separating gaseous carbon dioxide from a gas mixture, said gas mixture containing said gaseous carbon dioxide as well as further gases different from gaseous carbon dioxide, by cyclic adsorption/desorption using a sorbent material adsorbing said gaseous carbon dioxide, using a unit containing an adsorber structure with said sorbent material, said unit being evacuable to a vacuum pressure of 400 mbarabs or less, and said adsorber structure being heatable to a temperature of at least 60 °C for desorption of at least said gaseous carbon dioxide and said unit being openable to flow-through of said gas mixture and for contacting said gas mixture with said sorbent material for an adsorption step, wherein said method comprises at least the following sequential and in this sequence repeating steps (a)-(d):

(a) contacting said gas mixture with said sorbent material to allow at least said gaseous carbon dioxide to adsorb on said sorbent material under ambient atmospheric pressure and ambient atmospheric temperature in said adsorption step;

(b) isolating said sorbent material with adsorbed carbon dioxide in said unit from said flow-through while maintaining the temperature in the sorbent material and then evacuating said unit to a pressure in the range of 20-400 mbarabs;

(c) injecting a stream of saturated or superheated steam and thereby inducing an increase in internal pressure of said unit and an increase of the temperature of the sorbent material to a temperature between 6° and 110 °C, starting desorption of CO2;

(d) extracting at least desorbed gaseous carbon dioxide and steam from said unit and separating gaseous carbon dioxide from steam by condensation in and downstream of said unit;

(e) bringing the sorbent material to ambient atmospheric pressure and ambient atmospheric temperature;

wherein at least a portion of the desorbed gaseous carbon dioxide and steam flow exiting the adsorber structure in step (d) passes through a heat exchanger in which at least a part of the steam contained in said desorbed gaseous carbon dioxide and steam flow exiting the adsorber structure for the condensation, before a remaining portion of the desorbed gaseous carbon dioxide and steam flow exiting the adsorber structure continues to a vacuum pump and a CO2 production outlet, while on a cold side of said heat exchanger a flow of water is vaporized, and is compressed and added to a flow of freshly generated steam used for a portion or the entire duration of the same or a next adsorber structure's step (c) and/or a portion of said adsorber structure's step (d), and/or wherein at least a portion of a desorbed gaseous carbon dioxide and steam flow exiting the adsorber structure in step (d) is sent directly to a next adsorber structure that has already been evacuated for a portion or the entire duration of said next adsorber structure's step (c).

* * * * *